US012515795B2

(12) United States Patent
Hashimoto

(10) Patent No.: US 12,515,795 B2
(45) Date of Patent: *Jan. 6, 2026

(54) UNMANNED DELIVERY SYSTEM AND UNMANNED DELIVERY METHOD

(71) Applicant: KAWASAKI JUKOGYO KABUSHIKI KAISHA, Kobe (JP)

(72) Inventor: Yasuhiko Hashimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 275 days.

This patent is subject to a terminal disclaimer.

(21) Appl. No.: 18/034,092

(22) PCT Filed: Oct. 20, 2021

(86) PCT No.: PCT/JP2021/038766

§ 371 (c)(1),
(2) Date: Apr. 27, 2023

(87) PCT Pub. No.: WO2022/091910

PCT Pub. Date: May 5, 2022

(65) Prior Publication Data

US 2023/0391451 A1 Dec. 7, 2023

(30) Foreign Application Priority Data

Oct. 30, 2020 (JP) ................................ 2020-183351
Nov. 30, 2020 (JP) ................................ 2020-198526

(51) Int. Cl.
*B64D 1/22* (2006.01)
*B25J 5/00* (2006.01)
(Continued)

(52) U.S. Cl.
CPC ................ *B64D 1/22* (2013.01); *B64C 39/02* (2013.01); *B25J 5/007* (2013.01); *B64U 10/17* (2023.01);
(Continued)

(58) Field of Classification Search
CPC .... B64D 1/22; B64D 1/02; B64D 9/00; B64C 39/02; B64C 39/024; B25J 5/007; B25J 11/008; B25J 13/065; B25J 5/00; B25J 9/08; B25J 9/162; B25J 9/1664; B25J 9/1682; B25J 9/1689; B25J 13/02; B25J 13/089; B64U 10/17; B64U 10/20;
(Continued)

(56) References Cited

U.S. PATENT DOCUMENTS 9,079,662 B1 7/2015 Duffy et al.
11,231,706 B1 * 1/2022 Curlander ............ G05D 1/0684
(Continued)

FOREIGN PATENT DOCUMENTS

JP 2019-23020 A 2/2019
JP 2020-83600 A 6/2020

*Primary Examiner* — Kyle J Kingsland
(74) *Attorney, Agent, or Firm* — Oliff PLC

(57) ABSTRACT

An unmanned delivery system 100 includes a self-propelled robot 2, an unmanned aerial vehicle 1 which transports a package to an intermediate location on the way of delivering the package, and a robot controller which controls the self-propelled robot 2 so that the self-propelled robot 2 delivers to a receiver's address 4 the package which is unloaded at the intermediate location.

9 Claims, 26 Drawing Sheets

(51) Int. Cl.

| | |
|---|---|
| ***B64C 39/02*** | (2023.01) |
| ***B64U 10/17*** | (2023.01) |
| ***B64U 10/20*** | (2023.01) |
| ***B64U 101/30*** | (2023.01) |
| ***B64U 101/64*** | (2023.01) |

(52) U.S. Cl.
CPC .......... *B64U 10/20* (2023.01); *B64U 2101/30* (2023.01); *B64U 2101/64* (2023.01)

(58) Field of Classification Search
CPC ............ B64U 2101/30; B64U 2101/64; B64U 2101/67; G06Q 10/08; G06Q 10/083; G05D 1/0287; B62D 57/02
See application file for complete search history.

(56) References Cited

U.S. PATENT DOCUMENTS

| | | | |
|---|---|---|---|
| 2014/0254896 | A1 | 9/2014 | Zhou et al. |
| 2018/0137454 | A1 | 5/2018 | Kulkarni et al. |
| 2019/0262992 | A1 | 8/2019 | Kim |
| 2020/0175468 | A1* | 6/2020 | Tsuruta .............. G06Q 10/0832 |
| 2020/0207474 | A1 | 7/2020 | Foggia et al. |

* cited by examiner

UNMANNED DELIVERY SYSTEM AND UNMANNED DELIVERY METHOD

CROSS-REFERENCE TO RELATED APPLICATIONS

This application claims the priority to Japanese Patent Application No. 2020-183351 filed on Oct. 30, 2020, and Japanese Patent Application No. 2020-198526 filed on Nov. 30, 2020 with the Japan Patent Office, the entire contents of which are incorporated herein as a part of this application by reference.

TECHNICAL FIELD

The present disclosure relates to an unmanned delivery system and an unmanned delivery method.

BACKGROUND ART

Conventionally, delivery systems using drone(s) are known. For example, a delivery system disclosed in Patent Document 1 transports a package (load) to near a destination by using a vehicle, and then transports the package from there to the destination by using a drone.

REFERENCE DOCUMENT(S) OF CONVENTIONAL ART

Patent Document

[Patent Document 1] JP2020-083600A

DESCRIPTION OF THE DISCLOSURE

In the conventional delivery system described above, since the package is eventually delivered to the destination by using an unmanned flying object, it is difficult to smoothly deliver the package to an addressee, as compared with the current delivery system by using a vehicle and a vehicle driver.

The present disclosure is made to solve the above problem, and one purpose thereof is to provide a delivery system and a delivery method capable of smoothly delivering a package to an addressee.

In order to achieve the above-described purpose, an unmanned delivery system according to one embodiment of the present disclosure includes a self-propelled robot, an unmanned aerial vehicle which transports a package to an intermediate location on the way of delivering the package, and a robot controller which controls the self-propelled robot so that the self-propelled robot delivers to a receiver's address the package that is unloaded at the intermediate location.

Further, an unmanned delivery system according to another embodiment of the present disclosure includes a self-propelled robot, an unmanned aerial vehicle which transports a package and the self-propelled robot to an intermediate location on the way of delivering the package, and a robot controller that controls the self-propelled robot so that the self-propelled robot delivers to a receiver's address the package that is unloaded at the intermediate location.

Further, an unmanned delivery method according to yet another embodiment of the present disclosure includes transporting, by an unmanned aerial vehicle, a package to an intermediate location on the way of delivering the package, and delivering to a receiver's address, by the self-propelled robot, the package that is unloaded at the intermediate location.

Further, an unmanned delivery method according to yet another embodiment of the present disclosure includes transporting, by an unmanned aerial vehicle, a package and a self-propelled robot to an intermediate location on the way of delivering the package, and delivering to a receiver's address, by the self-propelled robot, the package which is unloaded at the intermediate location.

Effect of the Disclosure

The present disclosure has an effect of providing a delivery system and a delivery method capable of smoothly delivering a package to the addressee.

MODES FOR CARRYING OUT THE DISCLOSURE

Figure 1:
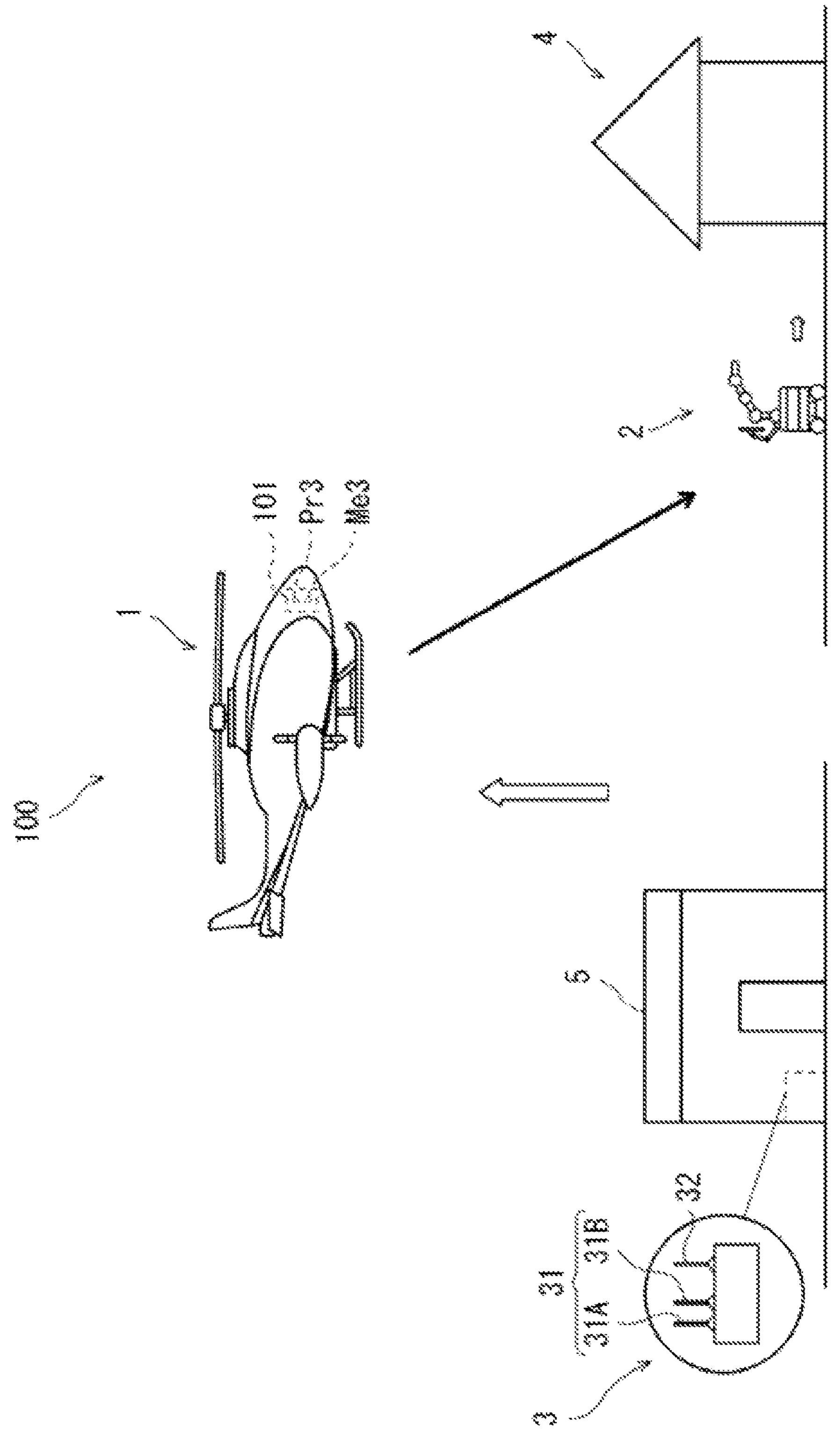
FIG. 1 is a schematic diagram illustrating one example of an outline configuration of an unmanned delivery system according to Embodiment 1 of the present disclosure.

Hereinafter, concrete embodiments of the present disclosure will be described with reference to the drawings. Below, the same reference characters are assigned to the same or corresponding elements throughout the drawings to omit redundant explanations. Further, since the following drawings are for explaining the present disclosure, elements unrelated to the present disclosure may be omitted, the dimension may not be exact because of an exaggeration etc., the elements may be simplified, modes of mutually-corresponding elements may not match with each other in a plurality of drawings. Moreover, the present disclosure is not limited to the following embodiments.

Embodiment 1

FIG. 1 is a schematic diagram illustrating one example of an outline configuration of an unmanned delivery system 100 according to Embodiment 1 of the present disclosure.

[Hardware Configuration]

Referring to FIG. 1, the unmanned delivery system 100 of Embodiment 1 includes an unmanned aerial vehicle 1, a self-propelled robot 2, and an operating unit 3. Below, the unmanned aerial vehicle is referred to as the "drone."

The unmanned delivery system 100 transports, by the drone 1, a package from a logistics base 5 to a location on the way to a receiver's address (addressee) 4 along a delivery route, and delivers to the receiver's address 4, by the self-propelled robot 2, the package which is unloaded at this intermediate location. Below, the "self-propelled robot" may simply be referred to as the "robot" for simplification. Further, the intermediate location along the delivery route means a location on the way of delivering the package. Below, these components will be described in detail.

<Drone 1>

Referring to FIG. 1, the drone 1 is not limited as long as it is capable of transporting the package to be delivered and the self-propelled robot 2. The drone 1 may be an airplane or a helicopter. The airplane may include, in addition to those which perform the normal takeoff and landing by sliding, a VTOL aircraft (Vertical Take-Off and Landing aircraft). Here, the drone 1 is comprised of the VTOL aircraft.

Figure 8A:
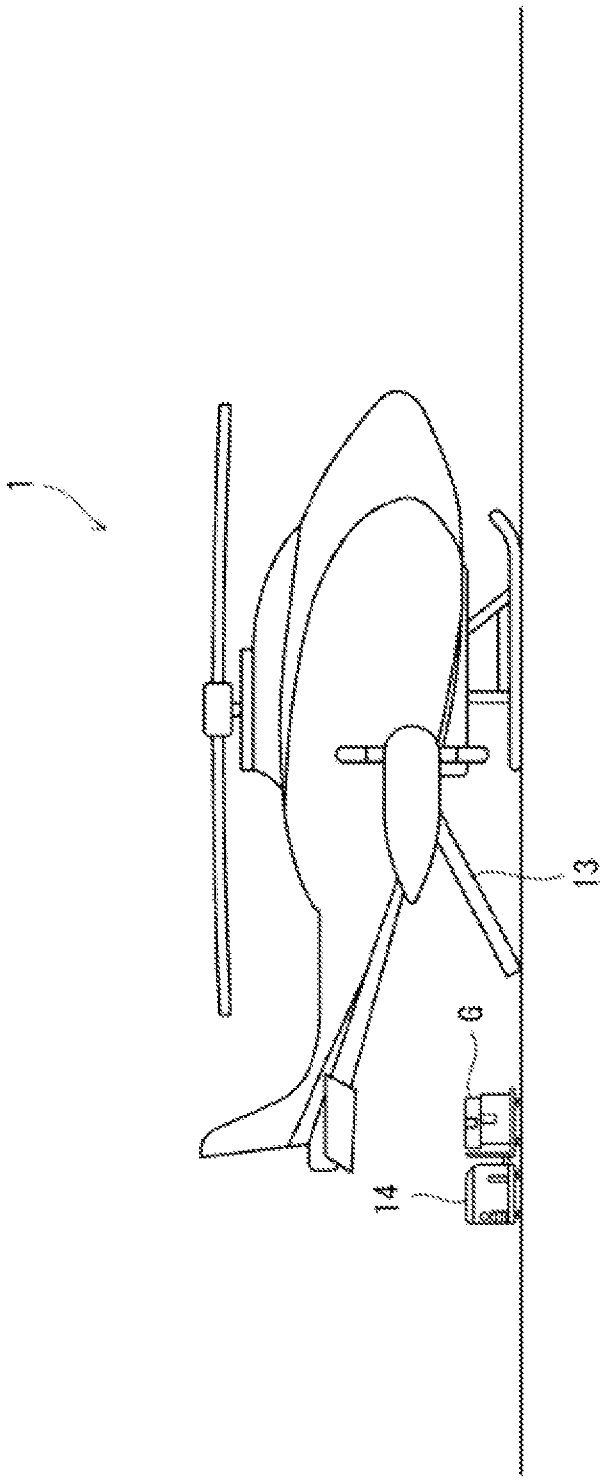
FIG. 8A is a schematic diagram illustrating one example of operation of the unmanned delivery system of FIG. 1 step by step.
Figure 8B:
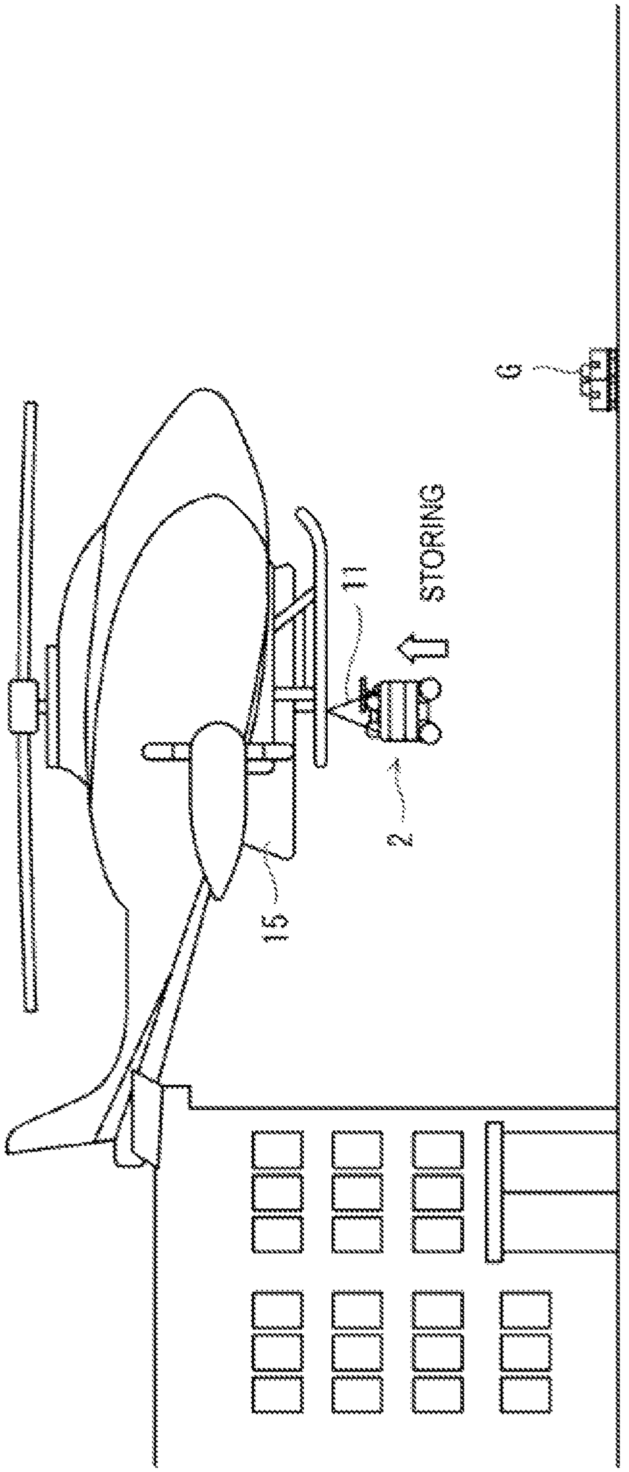
FIG. 8B is a schematic diagram illustrating one example of operation of the unmanned delivery system of FIG. 1 step by step.
Figure 8C:
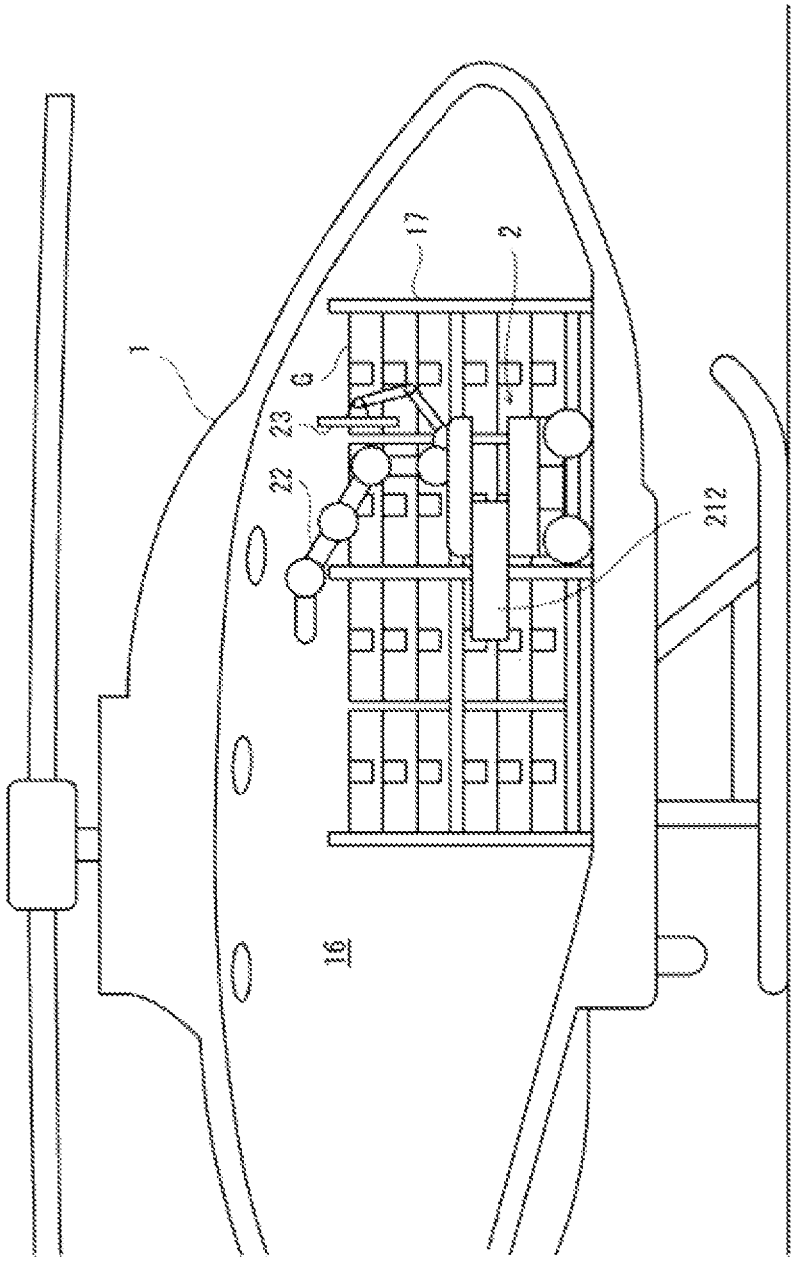
FIG. 8C is a schematic diagram illustrating one example of operation of the unmanned delivery system of FIG. 1 step by step.

A storage 16 is formed inside the drone 1, as illustrated in FIG. 8C. Referring to FIG. 8C, a load rack 17 is disposed inside the storage 16 so that it surrounds a center space. The storage 16 is configured so that the self-propelled robot 2 is stored in this center space and the self-propelled robot 2 can take out and in (pick up and store) the package from/to the load rack 17.

Referring to FIG. 8A, a cargo door 13 which opens and closes by being rotated in the front-and-rear direction using a lower end part as a fulcrum, is disposed on a side wall of a rear part of the drone 1. An inner surface of the cargo door 13 is formed to be flat, and the cargo door 13 becomes a carrying-in-out path for a package G when the cargo door 13 opens and a tip end thereof touches the ground. Further, referring to FIG. 8B, the drone 1 includes a hoist 11. Here, the hoist 11 includes a winch. Below, it is described as "the winch 11." For this winch 11, a hoist door 15 which opens and closes to the left and right downwardly is disposed on a bottom wall of the drone 1, and this hoist door 15 opens when an object is lifted and lowered by the winch 11. Referring to FIG. 1, a drone controller 101 is disposed in the drone 1. The drone controller 101 includes a processor Pr3 and a memory Me3.

<User Interface 3>

Figure 2:
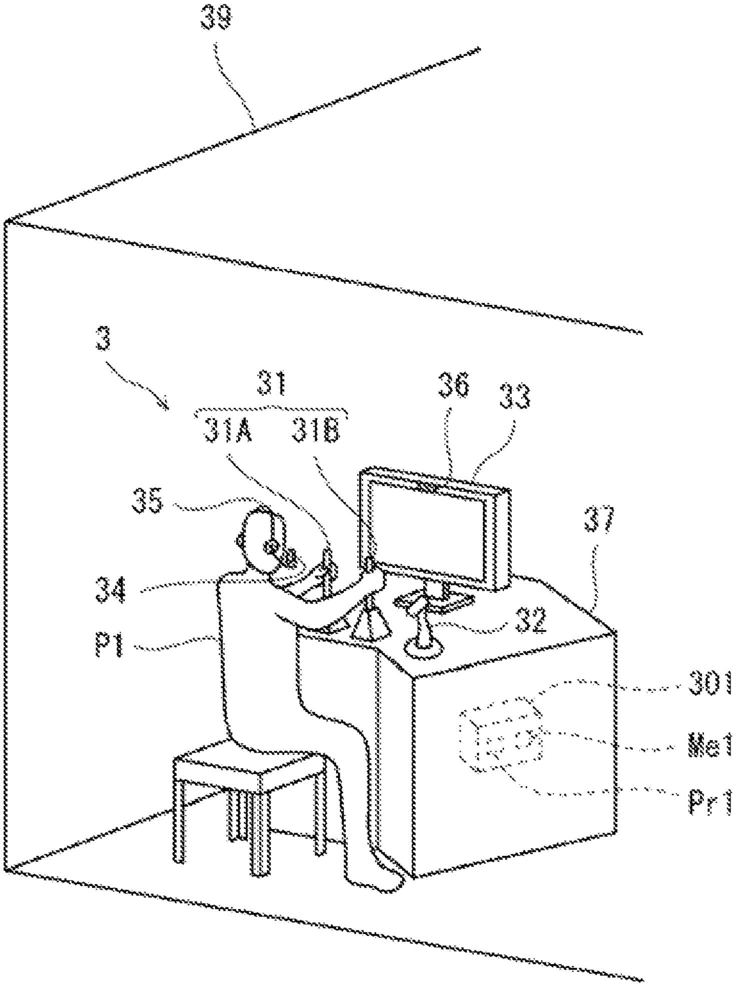
FIG. 2 is a perspective view illustrating one example of a detailed configuration of an operating unit of FIG. 1.
Figure 3:
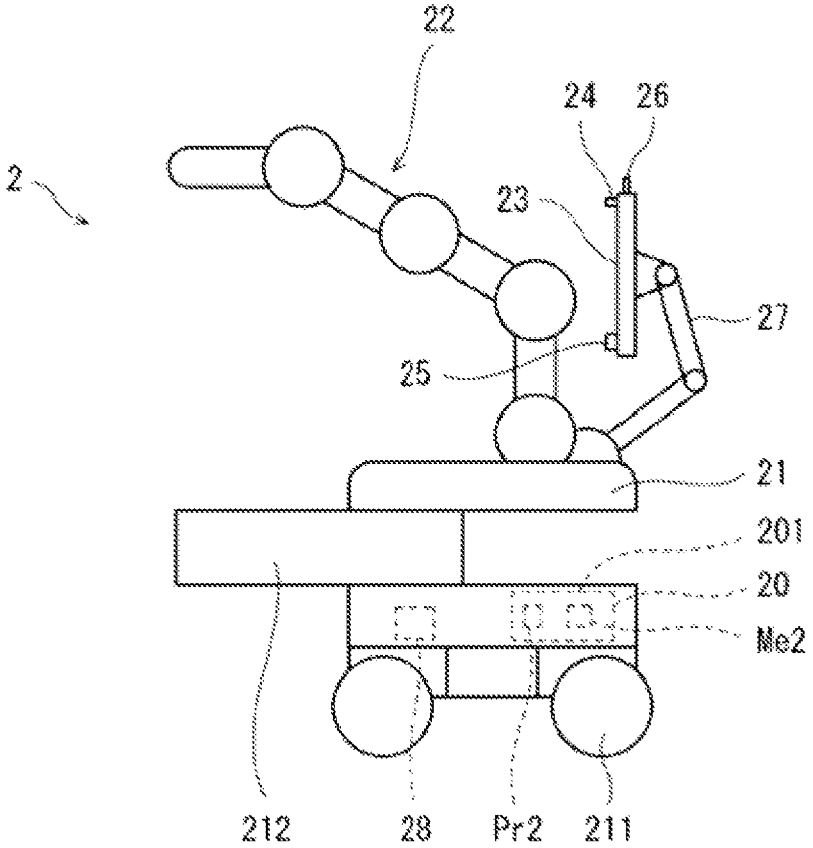
FIG. 3 is a side view illustrating one example of a configuration of a self-propelled robot of FIG. 1.

FIG. 2 is a perspective view illustrating one example of a detailed configuration of the operating unit 3 of FIG. 1. FIG. 3 is a side view illustrating one example of a configuration of the self-propelled robot 2 of FIG. 1.

Referring to FIG. 2, for example, the operating unit 3 is disposed in a control room 39. The disposed location of the operating unit 3 is not limited in particular. The operating unit 3 includes a robot interface 31 for manipulating the self-propelled robot 2, a drone interface 32 for manipulating the drone 1, an operator's display 33, an operator's microphone 34, an operator's speaker 35, and an operator's camera 36.

Referring to FIGS. 1 to 3, the robot interface 31 includes a traveller interface module 31A for manipulating a traveller 21 of the self-propelled robot 2, and an arm interface module 31B for manipulating a robotic arm 22 of the self-propelled robot 2. The traveller 21 may be a cart or a carrier. This arm interface module 31B includes an operating unit for manipulating a display robotic arm 27 for supporting a customer's display 23. The robot interface 31 may include various kinds of interface modules. Here, it includes a joystick, for example. The robot interface 31 is disposed on a desk 37.

The drone interface 32 includes various kinds of control levers for controlling the airplane, for example. Here, the drone interface 32 includes a joystick-type control lever. The drone interface 32 includes various kinds of operating units for controlling the drone 1. The drone interface 32 is disposed on the desk 37.

The operator's display 33 includes a liquid crystal display, for example. An image including information needed to be presented to an operator P1 is displayed on the operator's display 33. Such an image includes an image captured by a field-of-view camera 26 of the self-propelled robot 2, a field-of-view image captured by a field-of-view camera of the drone 1, and information, such as a position, a speed, and a fuel amount, which is required for controlling or manipulating the drone 1, as well as a navigation image, etc.

The operator's display 33 is disposed on the desk 37.

The operator's speaker 35 outputs audio information necessary for the operator P1. Although the operator's speaker 35 is herein included in a headphone, it may be configured in other forms.

The operator's microphone 34 acquires voice of the operator P1.

Although the operator's microphone 34 is herein included in the headphone or headset 35, it may be configured in other forms.

The operator's camera 36 images the operator P1. Although the operator's camera 36 is herein included in the operator's display 33, it may be disposed at other locations.

An operating unit controller 301 is disposed at the desk 37. The operating unit controller 301 includes a processor Pr1 and a memory Me1.

For example, when flying the drone 1, the operator P1 operates the drone interface 32 with the right hand to control the drone 1, and when operating the self-propelled robot 2, the operator P1 operates the traveller interface module 31A and the arm interface module 31B with the left and right hands, respectively, to control the self-propelled robot 2. The operator P1 is a package delivery company, for example. The delivery company may be a door-to-door delivery person in charge, for example. The operator P1 may not be the door-to-door delivery person in charge, but may be a dedicated operator.

<Self-Propelled Robot 2>

Referring to FIG. 3, the robot 2 which is one example of the self-propelled robot may be any robot as long as it is capable of autonomously traveling and capable of handling the package. Here, the robot 2 includes the traveller 21 which is capable of autonomously traveling, and the robotic arm 22 disposed on the traveller 21. The traveller 21 may be a cart or a carrier, for example. The component which handles the package may not necessarily be the robotic arm. In the robot 2 of FIG. 3, the left and the right in the drawing are the front and the rear in the traveling direction, respectively.

Figure 9A:
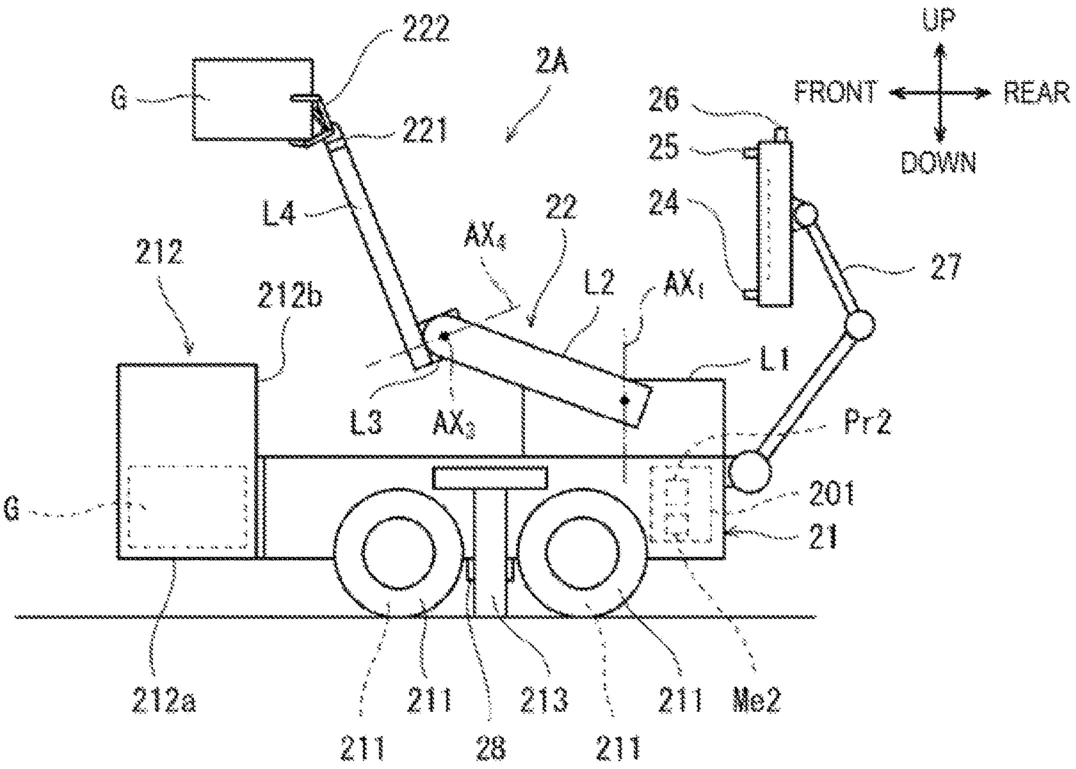
FIG. 9A is a side view illustrating one example of a configuration of a self-propelled robot used for an unmanned delivery system according to Embodiment 2 of the present disclosure.
Figure 9B:
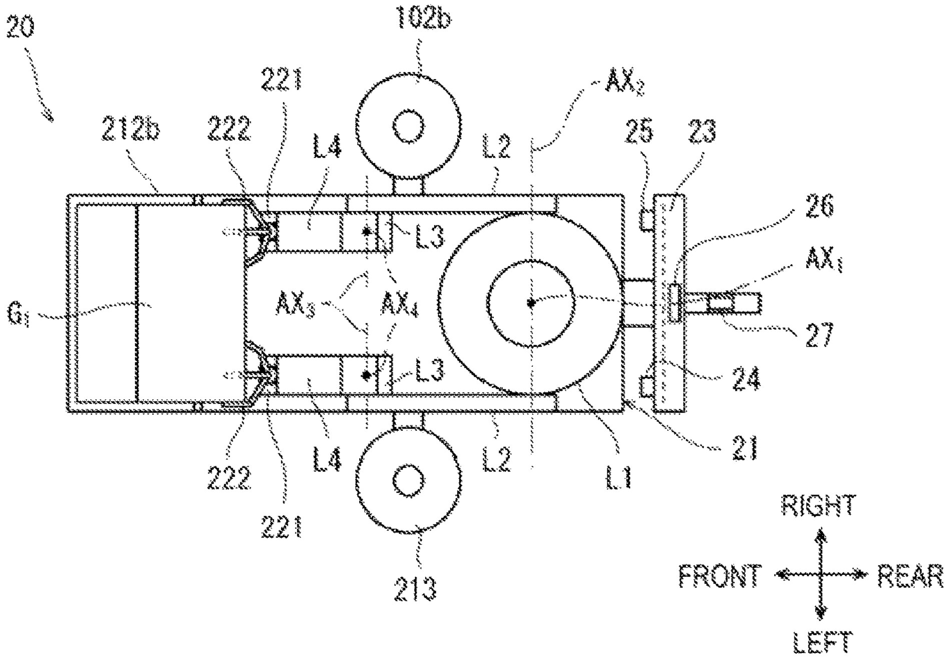
FIG. 9B is a plan view illustrating one example of the configuration of the self-propelled robot used for the unmanned delivery system according to Embodiment 2 of the present disclosure.

In FIG. 3, the robot 2 is illustrated in a simplified manner. Actually, as illustrated in FIGS. 9A and 9B, the robotic arm 22 of the robot 2 is configured similarly to a dual-arm robotic arm 22 of a robot 2A of Embodiment 2. That is, the robotic arm 22 of the robot 2 is a dual-arm vertical articulated robotic arm. However, while the robotic arm 22 of the robot 2A of Embodiment 2 is a four-axis vertical articulated robotic arm, the robotic arm 22 of the robot 2 of FIG. 3 is a five-axis vertical articulated robotic arm. Referring to FIGS. 9A and 9B, grippers 221 each of which is a wrist part including three pawls 222 are disposed at tip ends of the pair of robotic arms 22, respectively, and the pair of robotic arms 22 grasp the package G by the pair of grippers 221.

Referring to FIG. 3, actually, the traveller of the robot 2 includes a vehicle body frame of a rectangular parallelepiped shape, and a load accommodating unit 212 is disposed on the vehicle body frame so as to be movable in the front-and-rear direction. The vehicle body frame is covered by a suitable case, and an opening through which the load accommodating unit 212 enters and exits is formed in a front surface of the case. The load accommodating unit 212 is formed in a rectangular box shape with an upper surface opened, and is configured so that a front end surface is located at a retreated location where the front end surface becomes flush with the case when not carrying in and out the load, and the front end surface is located at a forwarded location where a given front part projects forward when carrying in and out the load.

A pair of front wheels 211 and a pair of rear wheels 211 are disposed at a bottom part of the traveller 21. For example, either the pair of front wheels 211 or the pair of rear wheels 211 are steering wheels, and either the pair of front wheels 211 or the pair of rear wheels 211 are driving wheels. A secondary battery 28 and a motor are mounted on the traveller 21, and the motor drives the driving wheels by using the secondary battery 28 as a power source. Further, the above-described load accommodating unit 212 is slidably driven in the front-and-rear direction by a given drive mechanism.

Moreover, the display robotic arm 27 is disposed behind the robotic arm 22 of the traveller 21. The customer's display 23 is attached to a tip end of the display robotic arm 27. A customer's microphone 24, a customer's speaker 25, and the field-of-view camera 26 are disposed at suitable locations of the customer's display 23. For example, the display robotic arm 27 includes a vertical articulated robotic arm, and may take arbitrary postures, and may turn the customer's display 23, the customer's microphone 24, the customer's speaker 25, and the field-of-view camera 26 in arbitrary directions.

Figure 8D:
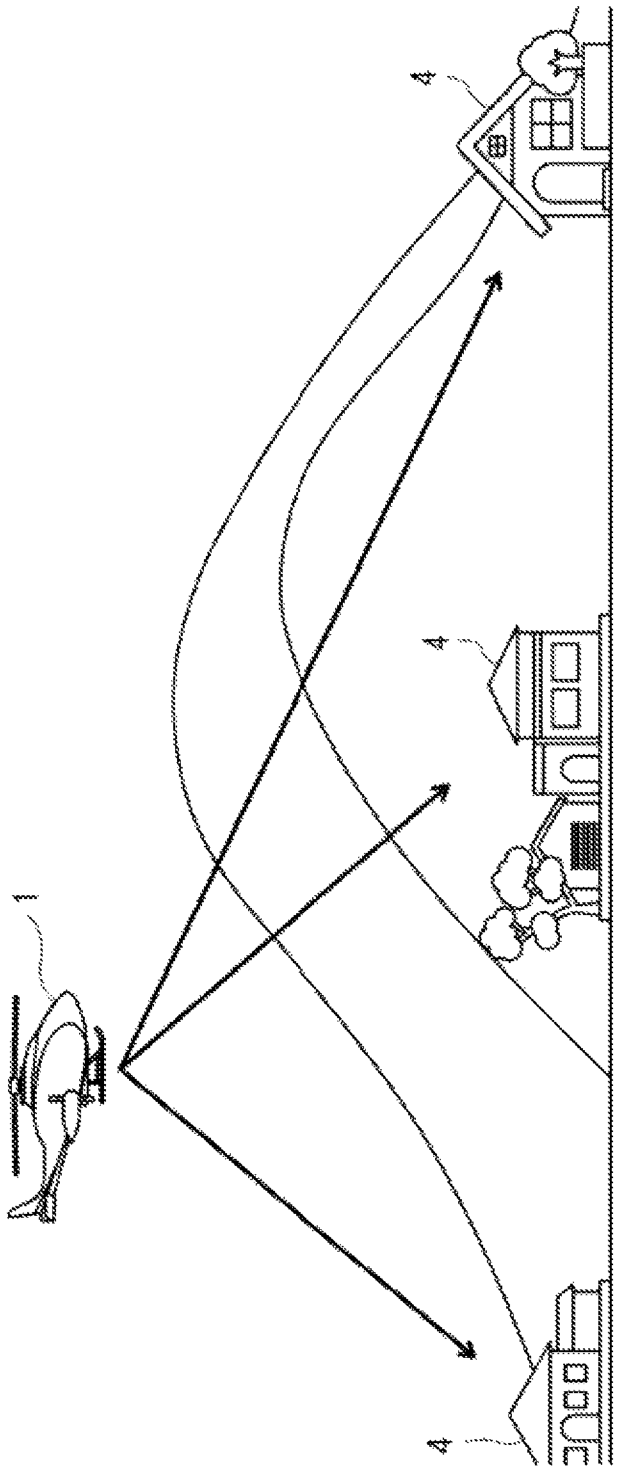
FIG. 8D is a schematic diagram illustrating one example of operation of the unmanned delivery system of FIG. 1 step by step.
Figure 8E:
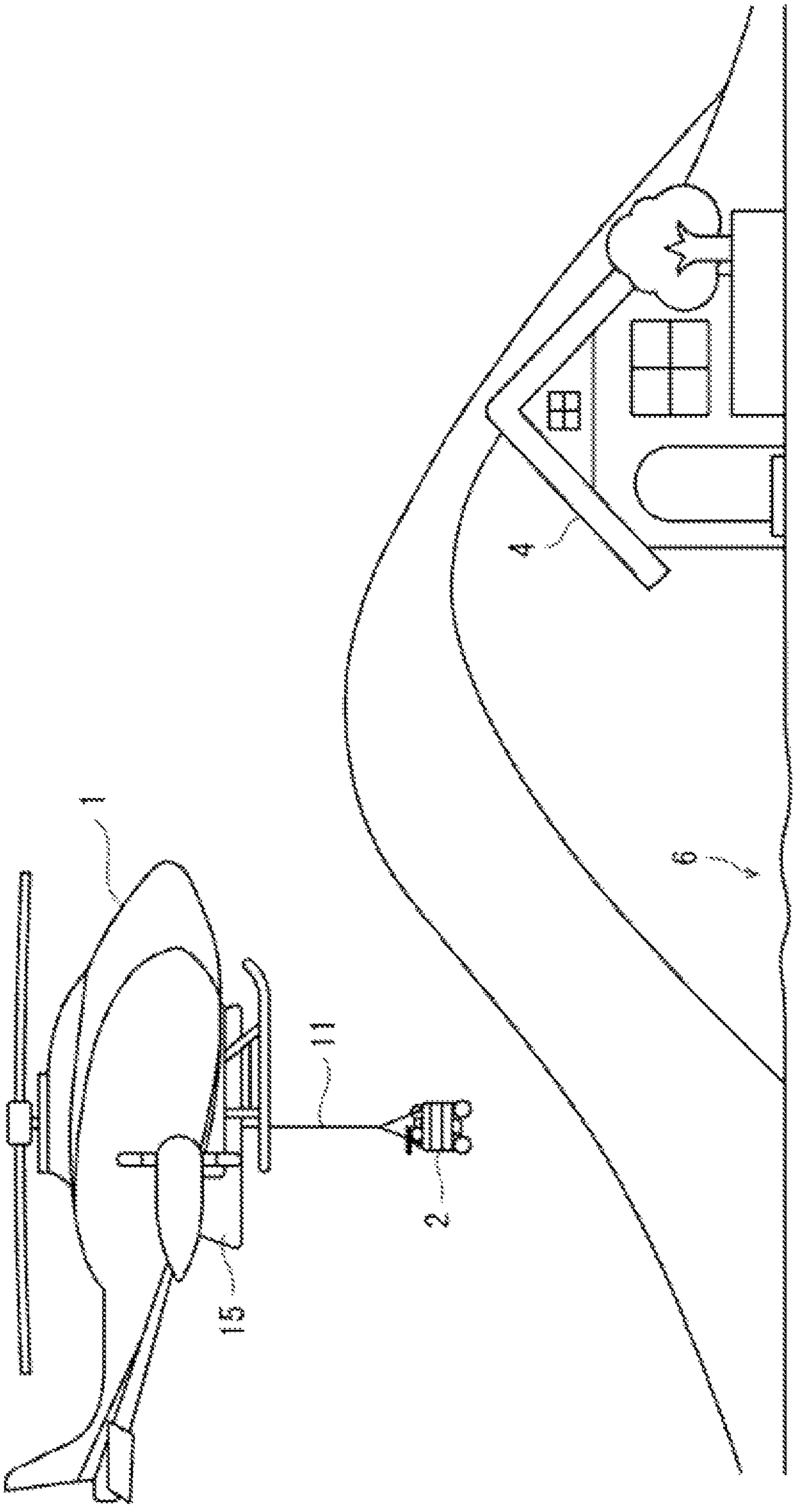
FIG. 8E is a schematic diagram illustrating one example of operation of the unmanned delivery system of FIG. 1 step by step.
Figure 8F:
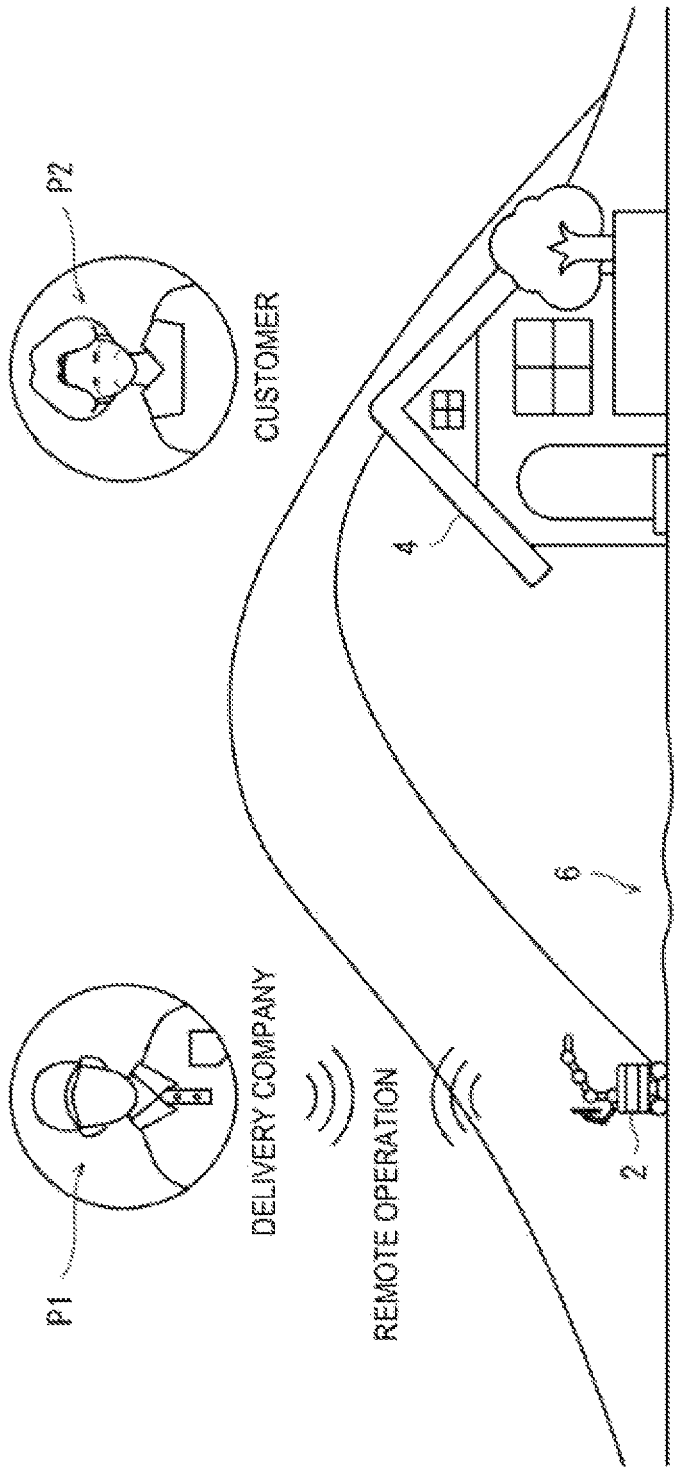
FIG. 8F is a schematic diagram illustrating one example of operation of the unmanned delivery system of FIG. 1 step by step.

The customer's display 23 includes a liquid crystal display, for example. As illustrated in FIG. 8F, an image including information needed to be presented to an addressee P2 is displayed on the customer's display 23. Such an image includes an image captured by the operator's camera 36.

The customer's speaker 25 outputs audio information necessary for the addressee P2. The audio information includes voice of the operator P1 acquired by the operator's microphone 34.

The operator's microphone 34 acquires the voice of the operator P1. Although the operator's microphone 34 is here included in the headphone 35, it may be configured in other forms.

The operator's camera 36 images the operator P1. Although the operator's camera 36 is here included in the operator's display 33, it may be disposed at other locations.

Further, a robot controller 201 is included in the traveller 21. The robot controller 201 includes a processor Pr2 and a memory Me2.

The robot 2 configured in this way is controlled by the robot controller 201 so that it autonomously operates or remotely operates to handle the package G by using the robotic arms 22 and move in a desired direction by using the traveller 21.

[Configuration of Control System]

Figure 4:
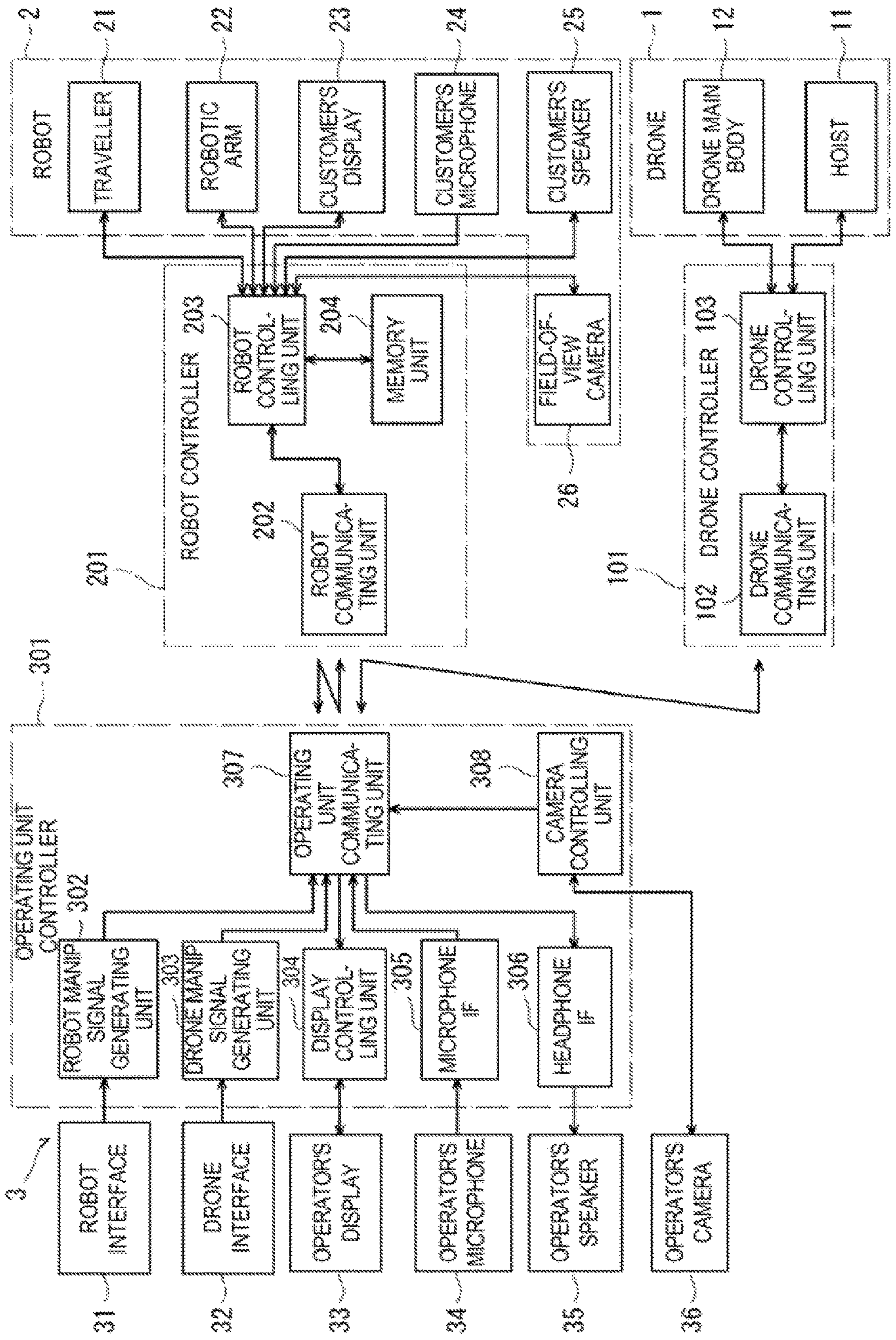
FIG. 4 is a functional block diagram illustrating one example of a configuration of a control system of the unmanned delivery system of FIG. 1.

FIG. 4 is a functional block diagram illustrating one example of a configuration of a control system of the unmanned delivery system 100 of FIG. 1.

Referring to FIG. 4, the unmanned delivery system 100 includes the operating unit controller 301, the robot controller 201, and the drone controller 101.

The operating unit controller 301 includes a robot manipulate signal generating unit 302, a drone manipulate signal generating unit 303, a display controlling unit 304, a microphone IF 305, a headphone IF 306, an operating unit communicating unit 307, and a camera controlling unit 308.

The operating unit communicating unit 307 includes a communicator which is capable of performing data communications. In the operating unit controller 301, the robot manipulate signal generating unit 302, the drone manipulate signal generating unit 303, the display controlling unit 304, the microphone IF 305, the headphone IF 306, and the camera controlling unit 308 are realized by a computing element including the processor Pr1 and the memory Me1. These are functional blocks implemented in this computing element by the processor Pr1 executing a control program stored in the memory Me1. In detail, this computing element includes a microcontroller, an MPU, an FPGA (Field Programmable Gate Array), or a PLC (Programmable Logic Controller), for example. These may be realized by a sole computing element which performs a centralized control, or may be realized by a plurality of computing elements which perform a distributed control. The robot manipulate signal generating unit 302 generates a robot manipulate signal according to operation of the robot interface 31. The drone manipulate signal generating unit 303 generates a drone manipulate signal according to operation of the drone interface 32. The display controlling unit 304 displays an image according to an image signal transmitted from the operating unit communicating unit 307 on the operator's display 33. The microphone IF 305 converts the voice acquired by the operator's microphone 34 into a suitable audio signal. The headphone IF 306 causes the operator's speaker to output audio according to the audio signal transmitted from the operating unit communicating unit 307. The camera controlling unit 308 generates an image signal of the image captured by the operator's camera 36.

The operating unit communicating unit 307 converts the robot manipulate signal transmitted from the robot manipulate signal generating unit 302, the drone manipulate signal transmitted from the drone manipulate signal generating unit 303, the audio signal transmitted from the microphone IF 305, and the image signal transmitted from the camera controlling unit 308 into wireless-communication signals, and wirelessly transmits the wireless-communication signals. Further, the operating unit communicating unit 307 receives the wireless-communication signals transmitted from a robot communicating unit 202, converts each signal into an image signal or an audio signal, and then transmits the image signal(s) to the display controlling unit 304 and transmits the audio signal(s) to the headphone IF 306. Further, the operating unit communicating unit 307 receives the wireless-communication signals transmitted from a drone communicating unit 102, converts them into information signals, and transmits them to the display controlling unit 304.

The robot controller 201 includes the robot communicating unit 202, a robot controlling unit 203, and a memory unit 204. The robot communicating unit 202 includes a communicator capable of performing data communications. The robot controlling unit 203 and the memory unit 204 are realized by a computing element including the processor Pr2 and the memory Me2. The robot controlling unit 203 and the memory unit 204 are functional blocks implemented in this computing element by the processor Pr2 executing a control program stored in the memory Me2. In detail, for example, this computing element is included in a microcontroller, an MPU, an FPGA (Field Programmable Gate Array), or a PLC (Programmable Logic Controller). These may be realized by a sole computing element which performs a centralized control, or may be realized by a plurality of computing elements which perform a distributed control.

The robot communicating unit 202 receives the wireless-communication signals transmitted from the operating unit communicating unit 307, converts each signal into a robot manipulate signal, an image signal, or an audio signal, and transmits these signals to the robot controlling unit 203. The robot controlling unit 203 controls operation of the robot 2 according to the robot manipulate signal, and displays an image according to the image signal on the customer's display 23, and causes the customer's speaker to output audio according to the audio signal.

The drone controller 101 includes the drone communicating unit 102 and a drone controlling unit 103. The drone communicating unit 102 includes a communicator capable of performing data communications. The drone controlling unit 103 is realized by a computing element including the processor Pr3 and the memory Me3. The drone controlling unit 103 is a functional block implemented in this computing element by the processor Pr3 executing a control program stored in the memory Me3. In detail, this computing element is included in a microcontroller, an MPU, an FPGA (Field Programmable Gate Array), or a PLC (Programmable Logic Controller), for example. These may be realized by a sole computing element which performs a centralized control, or may be realized by a plurality of computing elements which perform a distributed control.

The drone communicating unit 102 receives the wireless-communication signals transmitted from the operating unit communicating unit 307, converts them into drone manipulate signals, and transmits them to the drone controlling unit 103. Further, the drone communicating unit 102 converts the information signals transmitted from the drone controlling unit 103 into wireless-communication signals, and wirelessly transmits them.

The drone controlling unit 103 controls operation of a drone main body 12 and the hoist 11 of the drone 1 according to the drone manipulate signals transmitted from a drone communicating unit 102. The drone controlling unit 103 transmits the field-of-view image captured by the field-of-view camera of the drone 1, the information, such as the position, the speed, and the fuel amount, required for controlling the drone 1, and the navigation image to the drone communicating unit 102, as information signals.

Here, a function of one element disclosed herein may be performed using circuitry or processing circuitry including a general-purpose processor, a dedicated processor, an integrated circuit, an ASIC (Application Specific Integrated Circuits), a conventional circuit, and/or a combination thereof, which is configured or programmed to perform the disclosed function. Since the processor includes transistors and other circuitry, it is considered to be the processing circuitry or the circuitry. In the present disclosure, "module" or "unit" is hardware which performs the listed functions, or hardware programmed to perform the listed functions. The hardware may be hardware disclosed herein, or may be other known hardware programmed or configured to perform the listed functions. When the hardware is a processor considered to be a kind of circuitry, the "module" or the "unit" is a combination of hardware and software, and the software is used for the configuration of the hardware and/or the processor.

<Delivery Data>

Figure 5:
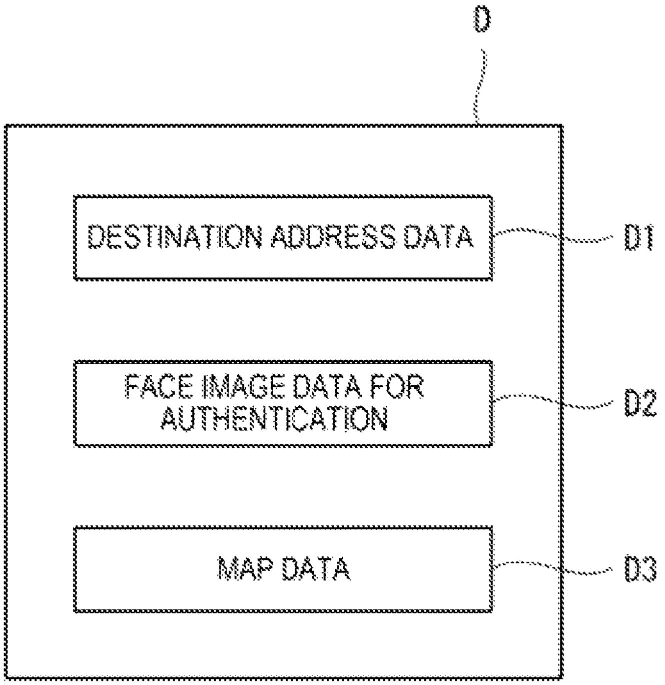
FIG. 5 is a schematic diagram illustrating one example of delivery data stored in a memory unit of a robot controller.

FIG. 5 is a schematic diagram illustrating one example of delivery data D stored in the memory unit 204 of the robot controller 201.

Referring to FIG. 5, the delivery data D includes destination address data D1, face image data D2 for authentication, and map data D3, for example. The destination address data D1 is a list of destination addresses. The face image data D2 for authentication is a face image data of the addressee P2 at the destination, and it is acquired from a client for the delivery when the delivery is accepted, and it is stored in the memory unit 204 of the robot controller 201. This face image data for authentication is stored so as to correspond to the destination address data D1. The map data D3 is used for the delivery by the robot 2.

<Autonomous Operation/Remote Operation Switchover Control>

The robot controlling unit 203 of the robot controller 201 changes operation between an autonomous operation and a remote operation to control the robot 2. The remote operation means manipulation using the robot interface 31 (in detail, operation which follows the robot manipulate signal).

Figure 6:
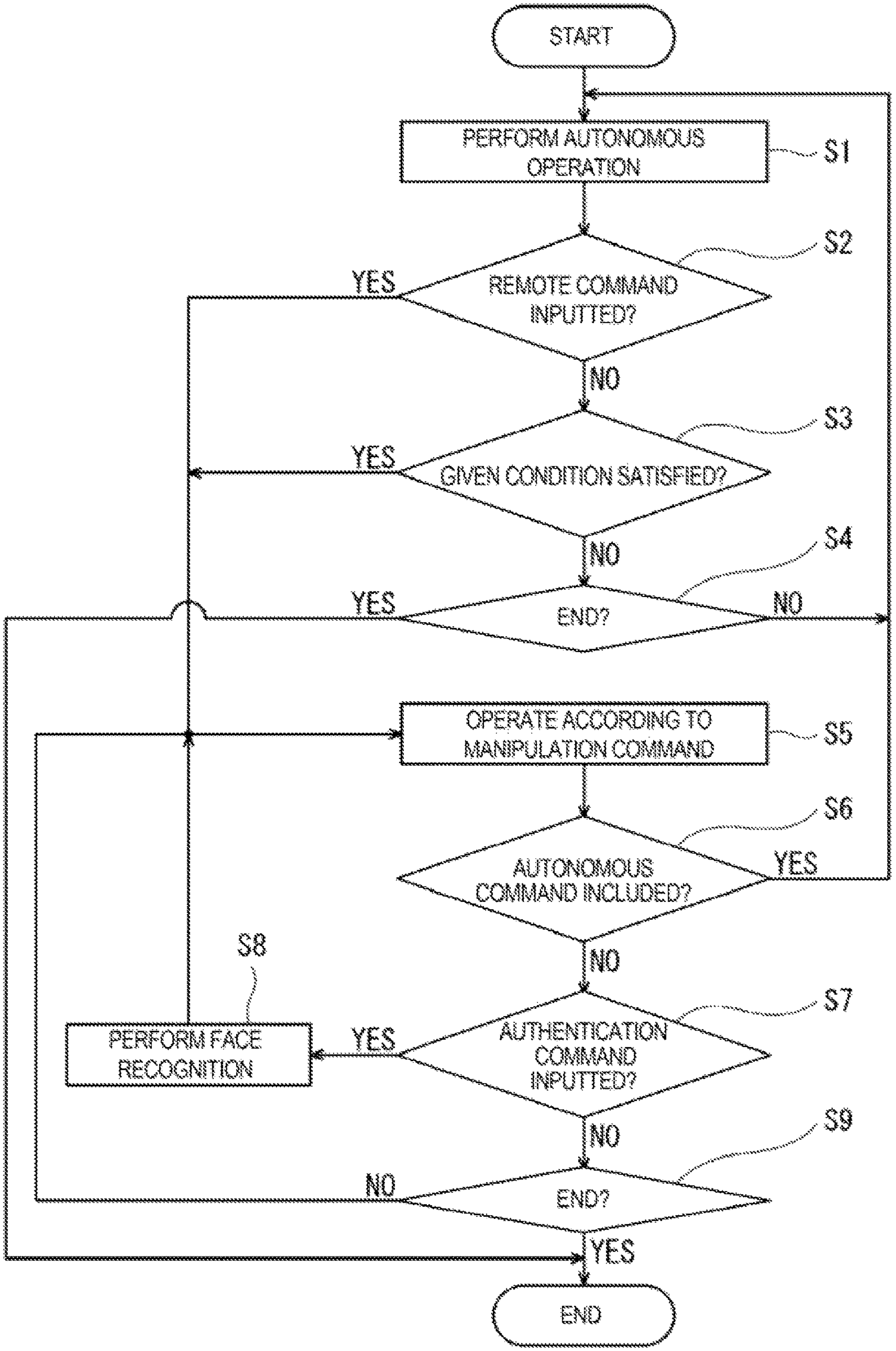
FIG. 6 is a flowchart illustrating one example of contents of an autonomous operation/remote operation switchover control.

FIG. 6 is a flowchart illustrating one example of contents of an autonomous operation/remote operation switchover control. Referring to FIG. 6, when the autonomous operation/remote operation switchover control is started, the robot controlling unit 203 causes the robot 2 to perform the autonomous operation (i.e., autonomous drive) (Step S1).

Next, the robot controlling unit 203 determines whether a remote command is inputted (Step S2). The remote command is included in the robot manipulate signal.

If the remote command is inputted (YES at Step S2), the robot controlling unit 203 causes the robot 2 to perform the remote operation (i.e., remote drive) (Step S5).

On the other hand, if the remote command is not inputted (NO at Step S2), the robot controlling unit 203 determines whether a given condition is satisfied (Step S3). This given condition is that, for example, a route to the receiver's address for the package is a rough terrain 6 illustrated in FIG. 8F, or a person approaches the robot 2.

If the given condition is satisfied (YES at Step S3), the robot controlling unit 203 causes the robot 2 to perform the remote operation (i.e., remote drive) (Step S5).

On the other hand, if the given condition is not satisfied (NO at Step S3), the robot controlling unit 203 determines whether a termination command is inputted (Step S4). The termination command is included in the robot manipulate signal.

If the termination command is not included (NO at Step S4), the robot controlling unit 203 returns this control to Step S1.

On the other hand, if the termination command is included, the robot controlling unit 203 ends this control.

When the remote operation (i.e., remote drive) is performed at Step S5 as described above, the robot controlling unit 203 determines whether the autonomous command is inputted (Step S6). The autonomous command is included in the robot manipulate signal.

If the autonomous command is included (YES at Step S6), the robot controlling unit 203 returns this control to Step S1.

On the other hand, if the autonomous command is not inputted, the robot controlling unit 203 determines whether an authentication command is inputted (Step S7). The authentication command is included in the robot manipulate signal.

If the authentication command is included (YES at Step S7), the robot controlling unit 203 performs a face recognition (Step S8). The face recognition is performed by the robot controlling unit 203 comparing the face image data stored in the memory unit 204 with the image of the addressee P2 which is imaged by the field-of-view camera 26. Well-known methods can be used for the face recognition. Therefore, the explanation is omitted.

After the face recognition is finished, the robot controlling unit 203 returns the operation of the robot 2 back to the remote operation (Step S5). In this case, if the face recognition is successful, the delivery of the package is proceeded, and if the face recognition is not successful, the delivery is suitably processed by a conversation between the operator P1 and the addressee P2.

On the other hand, if the authentication command is not inputted (NO at Step S7), the robot controlling unit 203 determines whether the termination command is inputted (Step S9).

If the termination command is not included (NO at Step S9), the robot controlling unit 203 returns this control to Step S5.

On the other hand, if the termination command is included, the robot controlling unit 203 ends this control.

Thus, the autonomous operation/remote operation switchover control is performed.

<Person Avoidance Control>

Next, a person avoidance control is described. The robot controlling unit 203 carries out image processing of the image captured by the field-of-view camera 26, and determines whether a person exists in the image. Since a method of extracting a person in the image by the image processing is well known, the explanation is omitted herein. When the person's image extracted from the image captured by the field-of-view camera 26 approaches the field-of-view camera, the robot controlling unit 203 moves the robot 2 in the opposite direction from the person's image. Whether or not the person's image approaches the field-of-view camera is determined, for example, based on the size and the enlarging speed of the person's image.

[Operation of Unmanned Delivery System 100]

Figure 7:
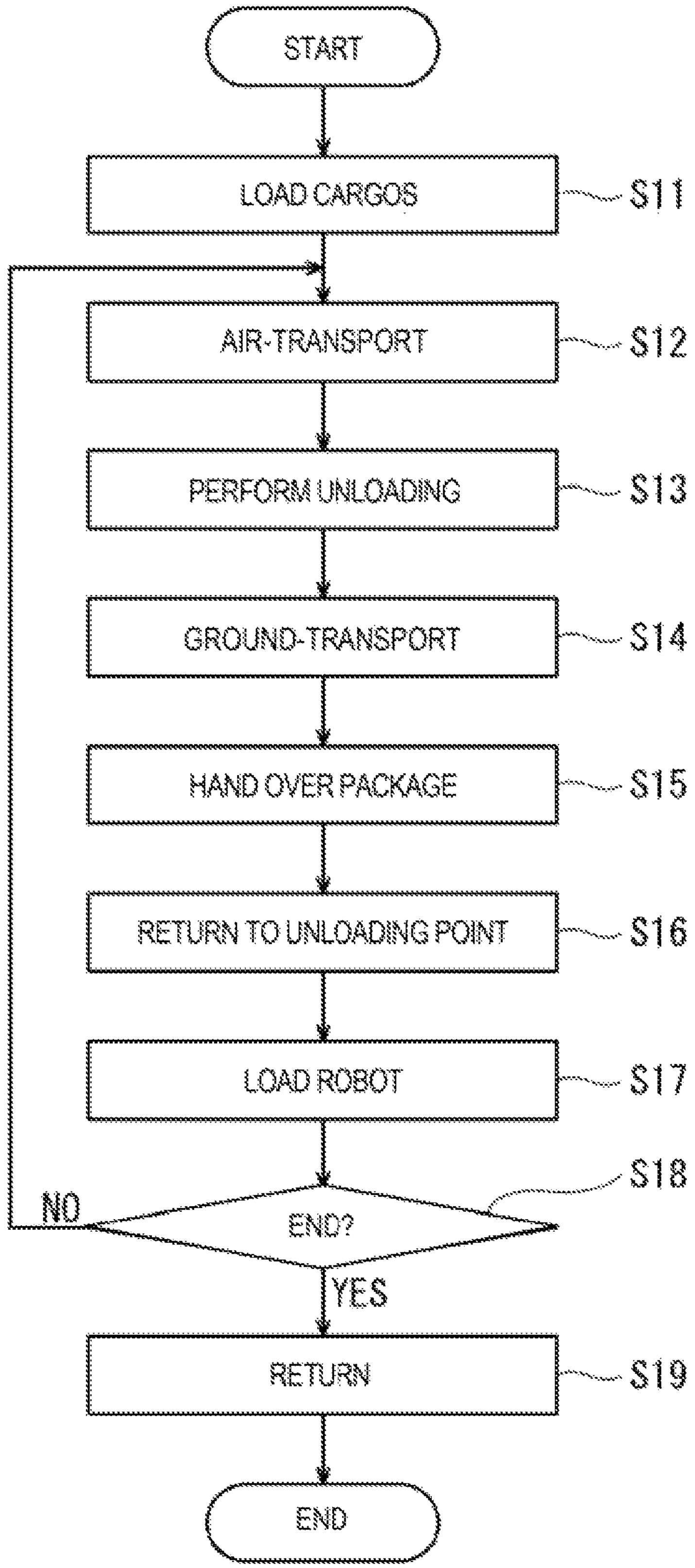
FIG. 7 is a flowchart illustrating one example of operation of the unmanned delivery system of FIG. 1.

Next, operation of the unmanned delivery system 100 configured as described above is described using FIGS. 1 to 8L. The operation of the unmanned delivery system 100 means an unmanned delivery method. FIG. 7 is a flowchart illustrating one example of the operation of the unmanned delivery system 100 of FIG. 1. FIGS. 8A to 8L are schematic diagrams illustrating one example of the operation of the unmanned delivery system 100 of FIG. 1 step by step. According to the operation of this unmanned delivery system 100, the drone 1 is operated by the operator P1, and the robot 2 is autonomously operated or remotely operated by the robot controlling unit 203 of the robot controller 201.

Referring to FIGS. 7 and 8A to 8C, loading of the cargos is first performed at the logistics base 5 (Step S11). This loading has three modes.

In a first mode, as illustrated in FIG. 8A, the cargo door 13 of the drone 1 is opened by the operator P1, and the package G is carried or loaded into the drone 1 through the cargo door 13 by a conveyance vehicle 14. In this case, the robot 2 gets into the drone 1 through the cargo door 13.

In a second mode, similarly to the first mode, the package G is carried into the drone 1 by the conveyance vehicle 14. As illustrated in FIG. 8B, the robot 2 is carried into the drone 1 by the winch 11. In this case, the drone 1 hovers (i.e., a hovering state), and the hoist door 15 is opened. Hooked parts with which hooks at tip ends of wires of the winch 11 engage are disposed at the four corners of an upper surface the traveller 21 of the robot 2. When the wires of the winch 11 are lowered, the robot 2 carries out the autonomous operation, and it engages the hooks at the tip ends of the wires with the hooked parts by itself. Further, as illustrated in FIG. 8B, the robot 2 takes a given storing posture. Here, sensors are disposed at the four hooked parts of the traveller 21 of the robot 2, and the robot controlling unit 203 carries out confirmation that the hooks at the tip ends of the wires are engaged with the hooked parts based on signals from the sensors. Then, it transmits a signal indicative thereof to the operating unit communicating unit 307. Then, this information is displayed on the operator's display 33. The operator P1 winds up the winch 11 to carry the robot 2 into the drone 1. Then, the hoist door 15 is closed.

In a third mode, the robot 2 accommodates the package G in the accommodating unit 212, and, similarly to the second mode, it is carried into the drone 1 by the winch 11.

Referring to FIG. 8C, the robot 2 puts the carried-in package G on the load rack 17 inside the storage 16 by the remote operation. In the third mode, if the package G is accommodated in the load accommodating unit 212 of the robot 2 itself, the robot 2 takes out the package G from the accommodating unit 212 and puts it on the load rack 17.

When the operation is finished, by the autonomous operation, the robot 2 charges the secondary battery 28 with the power from the drone 1, and then fixes itself to the storage 16 by using a suitable apparatus and takes the given storing posture described above.

Referring to FIG. 7, next, the package G and the robot 2 are airlifted (Step S12). Here, as illustrated in FIG. 8D, the package G is delivered to a plurality of receiver's addresses 4.

Next, below, a case where the receiver's address 4 is located in the suburbs and a case where the receiver's address 4 is located in the city are described separately.

<Suburban Receiver's Address 4>

Referring to FIG. 7, unloading is performed at an intermediate location on the way to the receiver's address 4 (Step S13). Referring to FIG. 8E, the unloading is performed by lowering the robot by using the winch 11, while the drone 1 hovers. This lowering is performed by the operator P1 while checking the ground situation by looking at the field-of-view image captured by the field-of-view camera of the drone 1 and displayed on the operator's display 33. This is for securing the safety. Further, in this case, the altitude of the drone 1 is more than a given altitude. The given altitude is set suitably, and it may be 20 m, for example. In this case, the robot 2 cancels the storing posture by the autonomous operation, and then accommodates the package G to be delivered from then on in the load accommodating unit 212, by the remote operation.

Then, after the robot 2 is lowered on the ground, it disengages the hooks at the tip ends of the wires of the winch 11 from the hooked parts by the autonomous operation.

Referring to FIG. 7, the package G is transported on the ground by the robot 2 to the receiver's address (Step S14). The drone 1 stands by up in the sky until the robot 2 returns.

Referring to FIG. 8F, in this case, the robot 2 travels on a suburban road, while looking up map data by the autonomous operation. Then, on the way, if it encounters the rough terrain 6, the operation is switched to the remote operation, and the robot 2 travels in accordance with the manipulation of the operator P1.

Figure 8G:
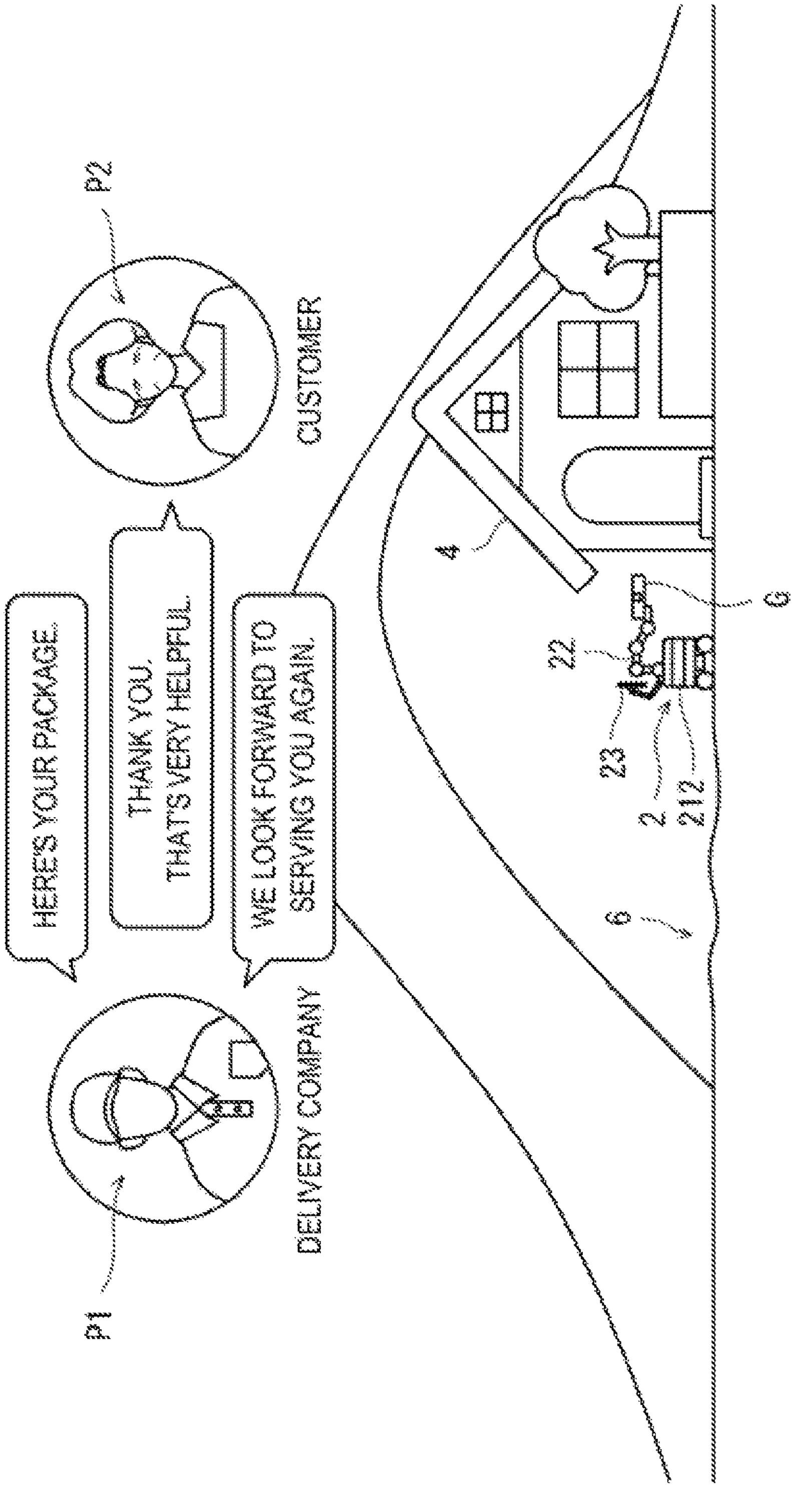
FIG. 8G is a schematic diagram illustrating one example of operation of the unmanned delivery system of FIG. 1 step by step.
Figure 8H:
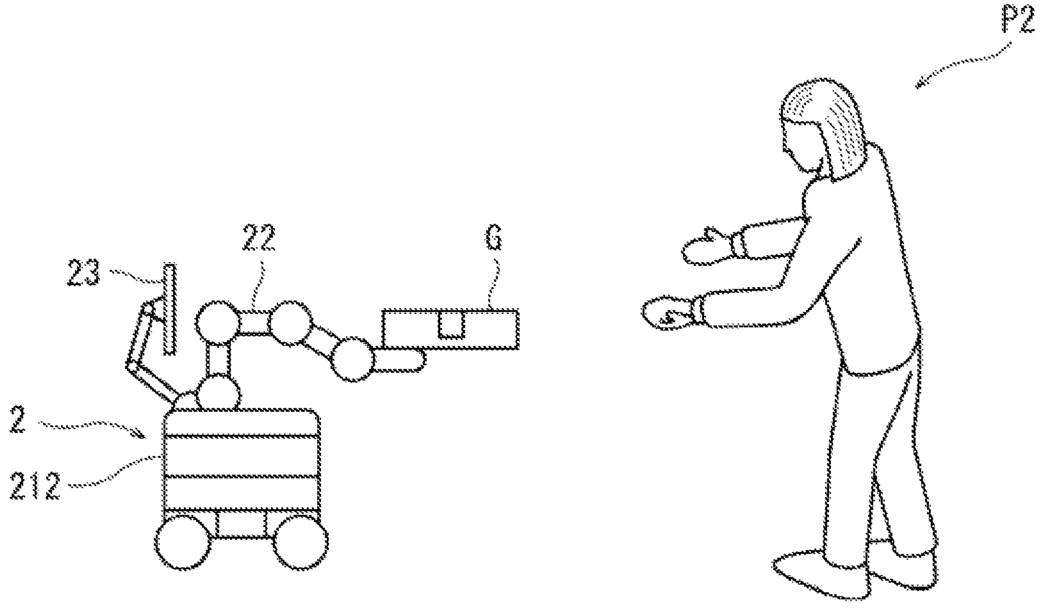
FIG. 8H is a schematic diagram illustrating one example of operation of the unmanned delivery system of FIG. 1 step by step.

Referring to FIG. 7, when the robot 2 arrives at the receiver's address 4, it then hands over the package G (Step S15). Referring to FIG. 8G, in this case, the operation is switched to the remote operation by the manipulation of the operator P1, and the robot 2 then pushes an interphone of the receiver's address 4, and performs the face recognition when the addressee (i.e., a customer) P2 appears. Then, when the addressee P2 approaches, the robot 2 stops automatically, and it will not move unless there is a trigger. From this state, the operation is switched to the remote operation automatically, and the robot 2 hands over the package G to the addressee P2. Here, as illustrated in FIG. 8H, the robot 2 automatically takes a given load presenting posture. If the addressee P2 approaches too much, the robot 2 automatically moves away from the addressee P2. In this case, the robot 2 has a conversation with the addressee P2. In detail, the robot controlling unit 203 causes the customer's speaker 25 to output the voice of the operator P1 acquired by the operator's microphone 34, displays the image of the operator P1 captured by the operator's camera 36 on the customer's display 23, causes the operator's speaker 35 to output the voice of the addressee P2 acquired by the customer's microphone 24, and displays the image of the addressee P2 captured by the field-of-view camera 26 on the operator's display 33 so that the addressee P2 and the operator P1 have a conversation. This conversation may be as follows, for example.

The operator P1 says, "Here's your package," the addressee P2 says, "Thank you. That is very helpful," and the operator P1 says, "We look forward to serving you again."

Referring to FIG. 7, the robot 2 returns to the unloading point similarly to the outward trip (Step S16). Then, the robot 2 is carried into the drone 1 which has been standing by (Step S17). The mode of loading the robot 2 is the same as the second mode of the loading at Step S11.

<City Receiver's Address 4>

Figure 8I:
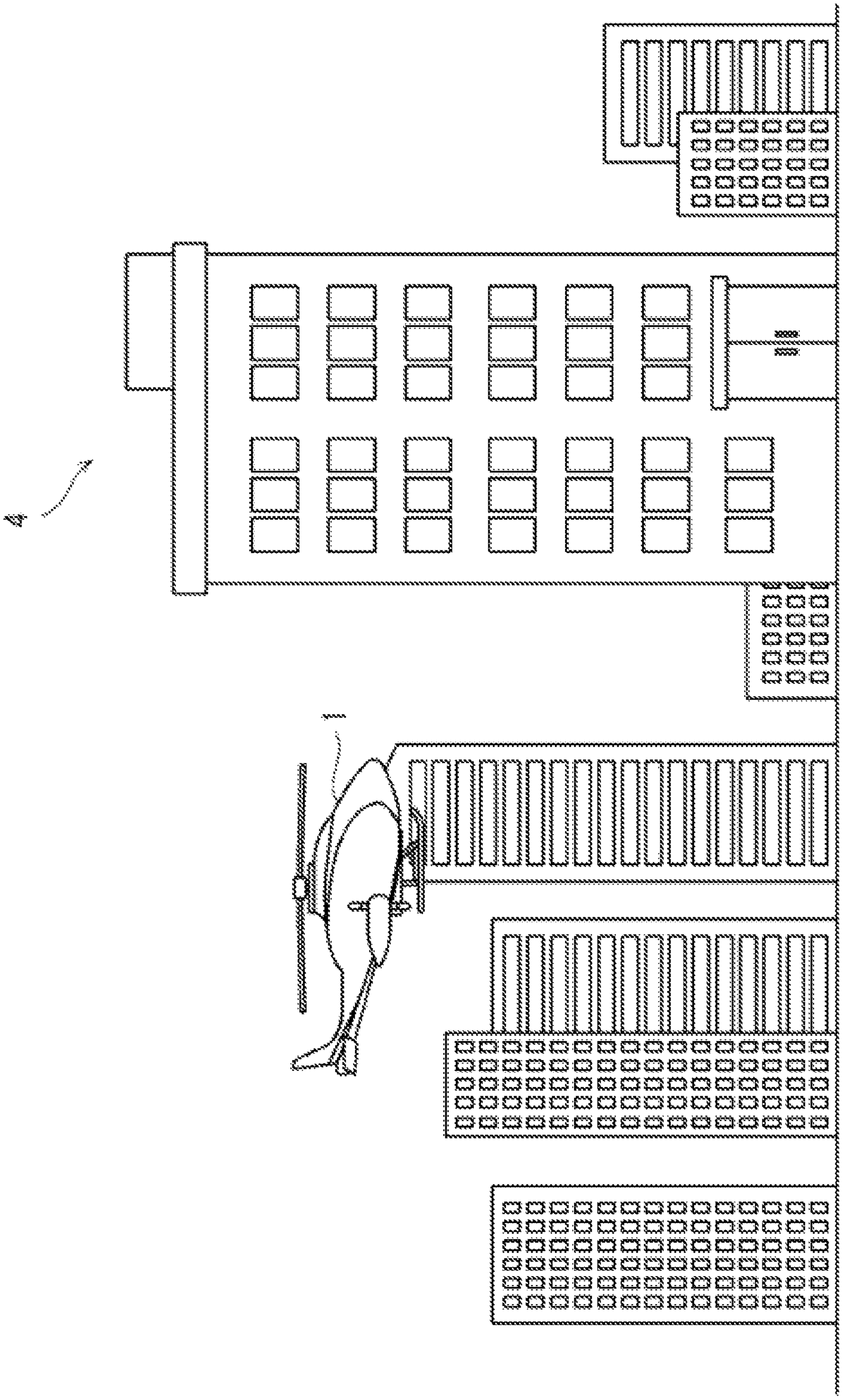
FIG. 8I is a schematic diagram illustrating one example of operation of the unmanned delivery system of FIG. 1 step by step.
Figure 8J:
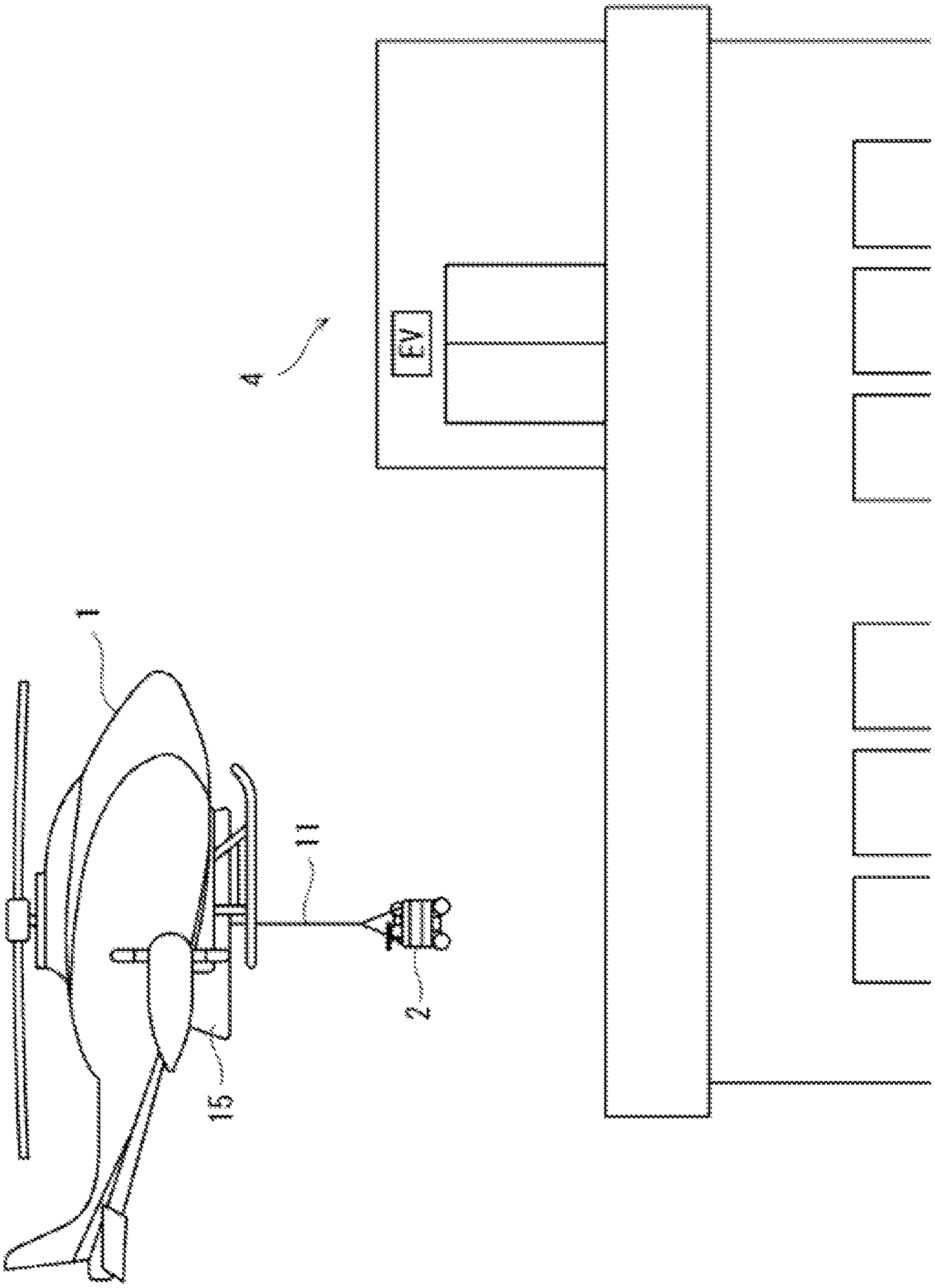
FIG. 8J is a schematic diagram illustrating one example of operation of the unmanned delivery system of FIG. 1 step by step.

Referring to FIG. 8I, in this case, the receiver's address 4 is one of rooms in a high-rise condominium. When the drone 1 reaches above the high-rise condominium, it lowers the robot 2 on the roof. There are two modes of lowering. A first lowering mode is the same as in the case where the receiver's address 4 is in the suburbs. In a second lowering mode, the drone 1 lands on the roof and the robot 2 then gets down to the roof from the opened cargo door 13.

Figure 8K:
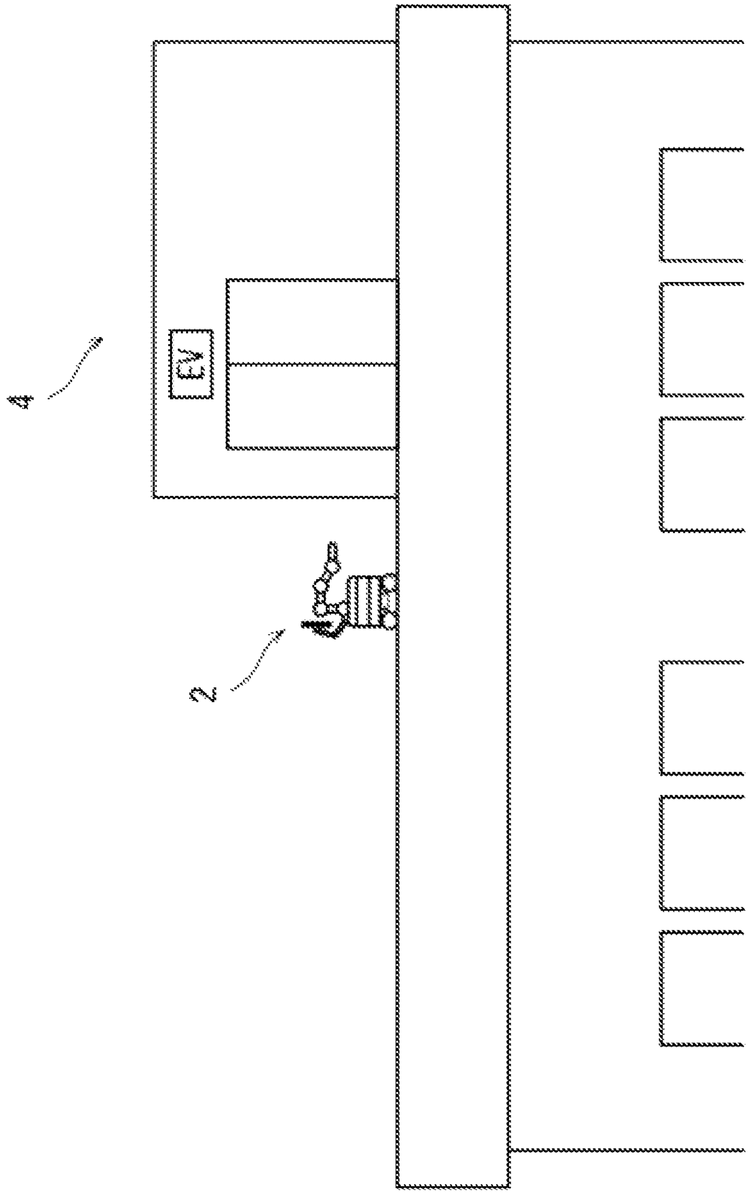
FIG. 8K is a schematic diagram illustrating one example of operation of the unmanned delivery system of FIG. 1 step by step.
Figure 8L:
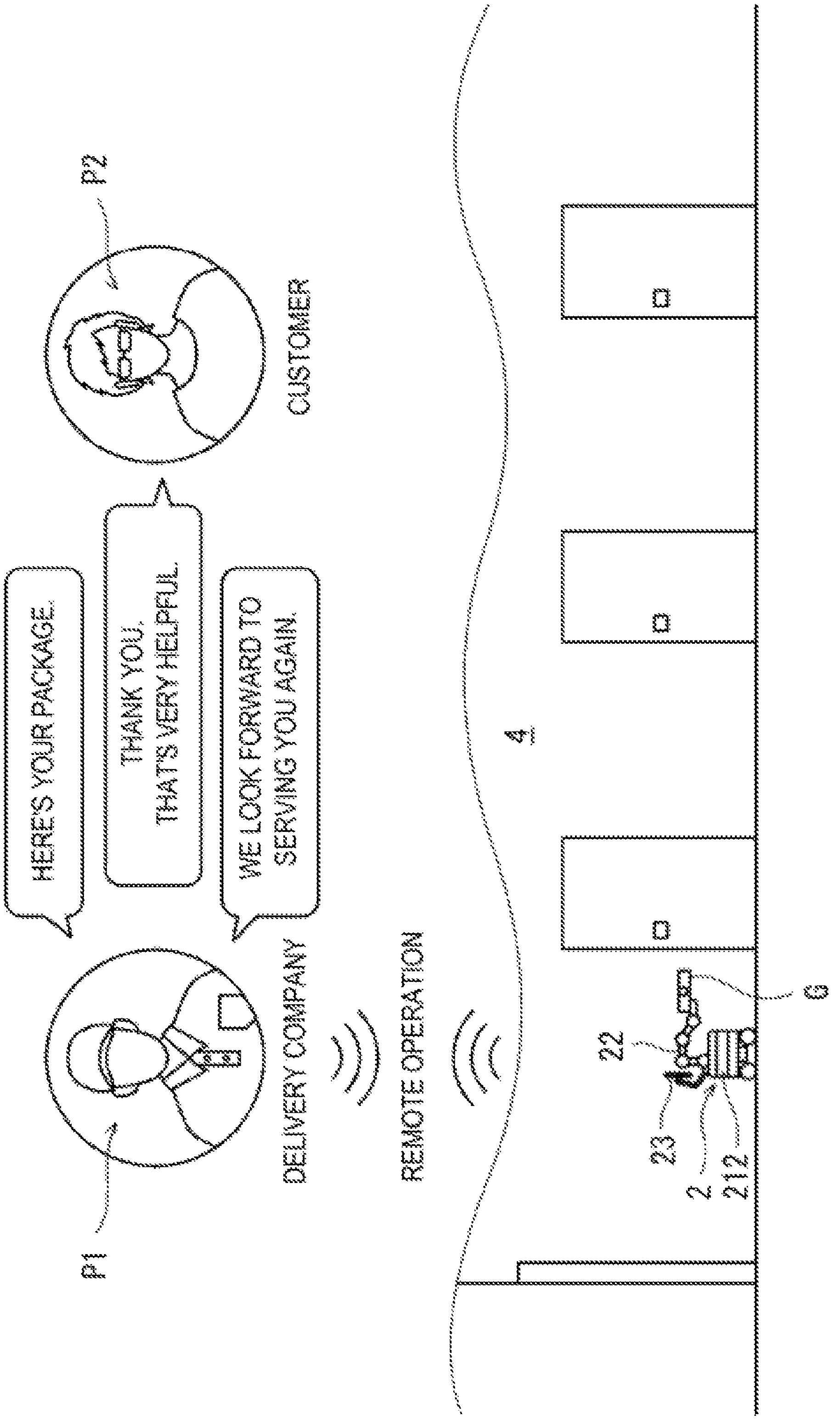
FIG. 8L is a schematic diagram illustrating one example of operation of the unmanned delivery system of FIG. 1 step by step.

Referring to FIG. 7, the package G is carried inside the condominium (i.e., transported on the ground) to the receiver's address 4 by the robot 2 (Step S14). The drone 1 stands by up in the sky until the robot 2 returns. In this case, the robot 2 is remotely operated. Referring to FIG. 8K, the robot 2 gets down to a target story of the high-rise condominium by using an elevator. In this case, the door of the elevator is opened and closed wirelessly by the robot 2.

Referring to FIG. 8K, when the robot 2 comes to near a destination room which is the receiver's address 4, the operation is switched to the remote operation by operation of the operator. The subsequent hand-over process is the same as in the case where the receiver's address 4 is in the suburbs, and therefore, the explanation is omitted.

The robot 2 arrives at the roof by the autonomous operation which includes occasional remote operations. Then, the robot 2 is carried into the drone 1 which has been standing by (Step S17). The mode of loading of the robot 2 is the same as the second mode of loading at Step S11.

<Delivery to Next Receiver's Address 4 and Return>

After the delivery operation to one of the receiver's addresses 4 is finished, a delivery operation to the next receiver's address 4 is performed similarly to the above, and after the delivery operations to all the receiver's addresses 4 are finished, the drone 1 returns to the logistics base 5 (Steps S18 and S19).

{Modification 1}

In Modification 1, the robot 2 is disposed at a location on the way to the above-described receiver's address 4. In this case, the robot 2 may remain in the place, or may be collected by the drone 1.

According to Embodiment 1 described above, the delivery of the package G to the addressee P2 can be performed smoothly.

Embodiment 2

An unmanned delivery system of Embodiment 2 differs from the unmanned delivery system 100 of Embodiment 1 in that the robot 2A is used instead of using the robot 2 of Embodiment 1, and, except for that, it is the same as the unmanned delivery system 100 of Embodiment 1.

FIG. 9A is a side view illustrating one example of a configuration of the robot 2A used for the unmanned delivery system according to Embodiment 2 of the present disclosure. FIG. 9B is a plan view illustrating one example of the configuration of the robot 2A used for the unmanned delivery system according to Embodiment 2 of the present disclosure.

Referring to FIGS. 9A and 9B, the robot 2A includes the traveller 21 and the pair of robotic arms 22 disposed on the traveller 21. The traveller 21 may be a cart or carrier. The pair of robotic arms 22 each include a four-axis vertical articulated robotic arm. That is, each robotic arm 22 includes a first link L1 rotatable on a vertical first rotation axis $Ax_1$. This first link L1 is common to the both robotic arms 22. A base-end part of a second link L2 is disposed at a tip-end part of the first link L1 so as to be rotatable on a second rotation axis $Ax_2$ perpendicular to the first rotation axis $Ax_1$. A base-end part of a third link L3 is disposed at a tip-end part of the second link L2 so as to be rotatable on a third rotation axis $Ax_3$ perpendicular to the second rotation axis $Ax_2$. A base-end part of a fourth link L4 is disposed at a tip-end part of the third link L3 so as to be rotatable on a fourth rotation axis $Ax_4$ perpendicular to the third rotation axis $Ax_3$. Further, the gripper 221 including the three pawls 222 is disposed at a tip end of the fourth link L4. The pair of robotic arms 22 grasp the package G by the pair of grippers 221.

The traveller 21 of the robot 2 is formed in a cart shape, and includes the load accommodating unit 212 in a front end part. The load accommodating unit 212 is formed in a rectangular box shape including a bottom wall 212*a* and a side wall 212*b*, in which an upper surface is opened. An upper part of a rear wall part of the load accommodating unit 212 is removed so that the pair of robotic arms 22 can put the package G into the package accommodating unit from the removed part. The pair of front wheels 211 and the pair of rear wheels 211 are disposed at the bottom part of the traveller 21. For example, either the pair of front wheels 211 or the pair of rear wheels 211 are steering wheels, and either the pair of front wheels 211 or the pair of rear wheels 211 are driving wheels. The secondary battery 28 and the motor are mounted on the traveller 21, and the motor drives the driving wheels by using the secondary battery 28 as a power source. Further, a pair of outriggers 213 are disposed at both sides of a center part of the traveller 21. The outriggers 213 are configured to be accommodatable inside the traveller 21. When the robot 2A stops and performs loading and unloading the package G, the outriggers 213 project to the left and right from the traveller 21 and push the ground so that the movement of the traveller 21 is prevented.

Further, the display robotic arm 27 is disposed behind the robotic arm 22 of the traveller 21. Since this display robotic arm 27 is the same as that of Embodiment 1, the explanation is omitted.

According to such an unmanned delivery system of Embodiment 2, similar effects to the unmanned delivery system 100 of Embodiment 1 are acquired.

Embodiment 3

In Embodiment 3, the operator P1 can operate robots 2 of Embodiment 1 or Embodiment 2. Other configurations are similar to those of Embodiment 1 or Embodiment 2.

In detail, referring to FIG. 4, an unmanned delivery system of Embodiment 3 includes the robots 2. An identification symbol is given to each of the robots 2. The robot interface 31 includes an interface module for specifying the robot 2 to be manipulated. The robot manipulate signal generating unit 302 assigns the identification symbol of the specified robot 2 to the robot manipulate signal according to the operation of the interface module. The robot controlling unit 203 of each robot 2 controls the robot 2 based on the robot manipulate signal, when the robot manipulate signal includes the identification symbol of the robot 2 to which itself belongs.

Therefore, the operator P1 can manipulate the self-propelled robots 2 by the sole robot interface 31.

According to Embodiment 3 described above, the unmanned delivery can be performed efficiently.

Embodiment 4

An unmanned delivery system of Embodiment 4 differs from the unmanned delivery system 100 of Embodiment 1 in that a robot 2B is used instead of the robot 2 of Embodiment 1, and, except for that, it is the same as the unmanned delivery system 100 of Embodiment 1.

Figure 10:
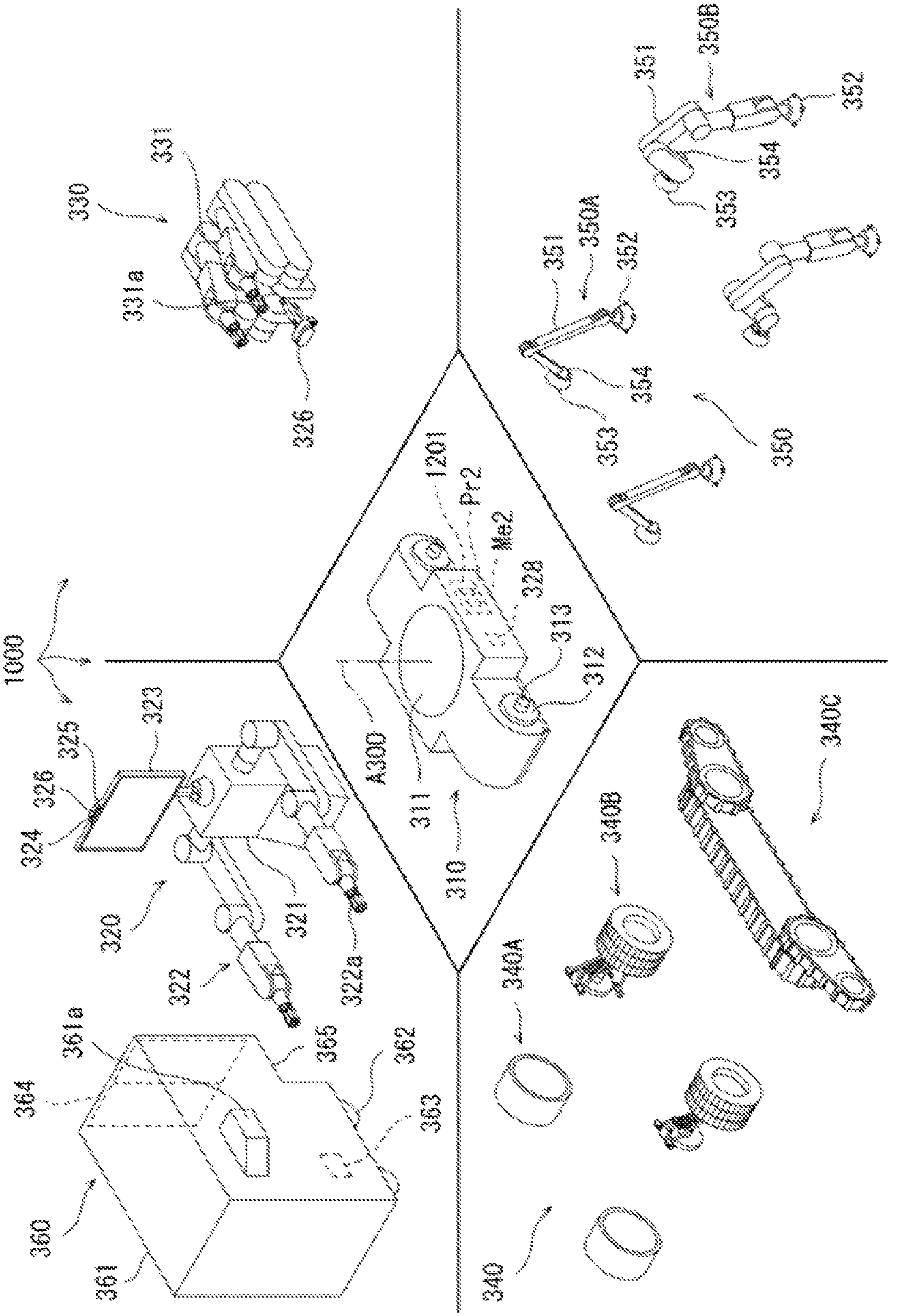
FIG. 10 is an exploded view illustrating one example of a configuration of a mobile robot used for an unmanned delivery system according to Embodiment 4 of the present disclosure.
Figure 11:
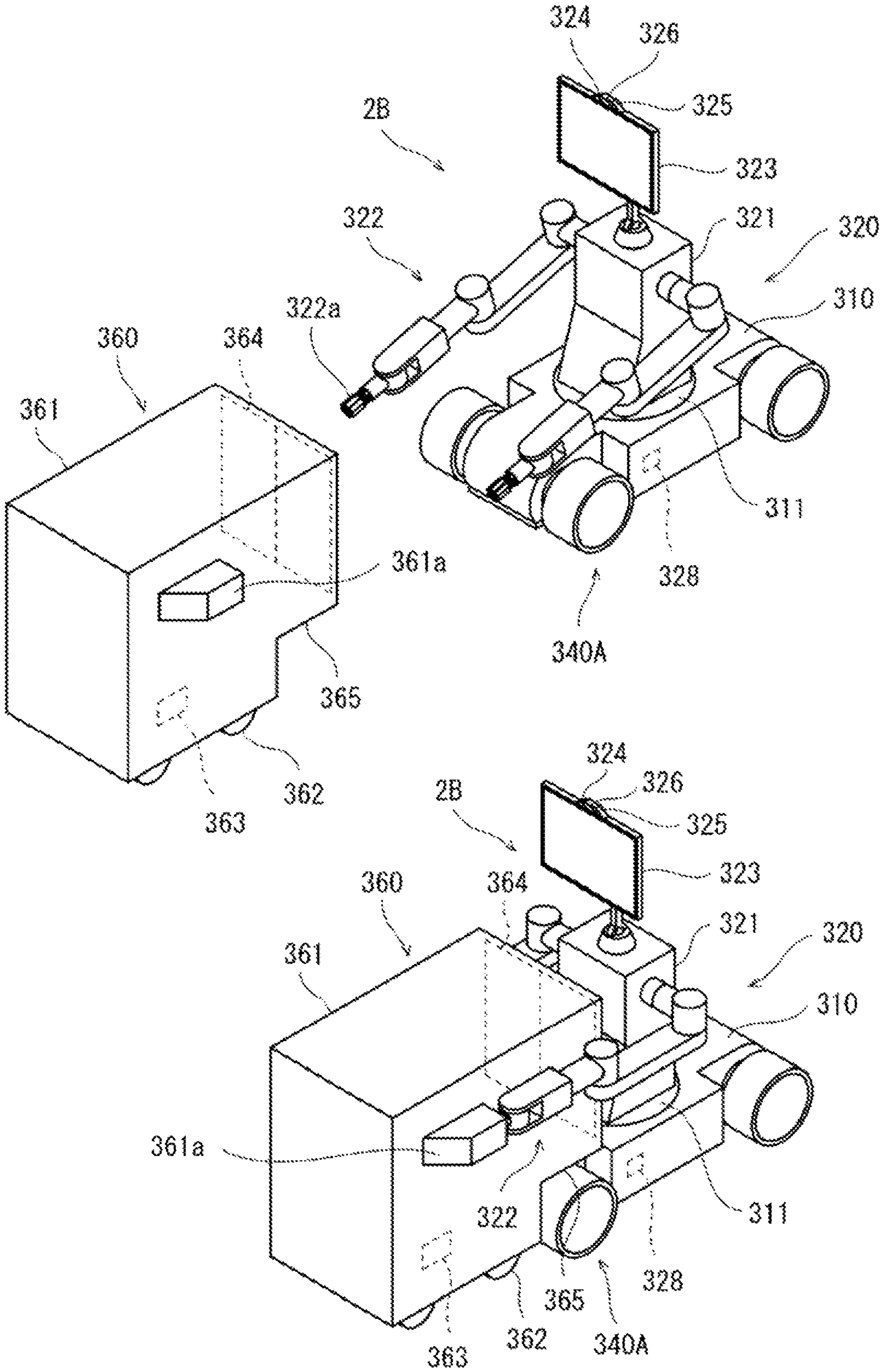
FIG. 11 is a perspective view illustrating a first configuration and use mode of a self-propelled robot in which the mobile robot of FIG. 10 is configured as a delivery robot.
Figure 12:
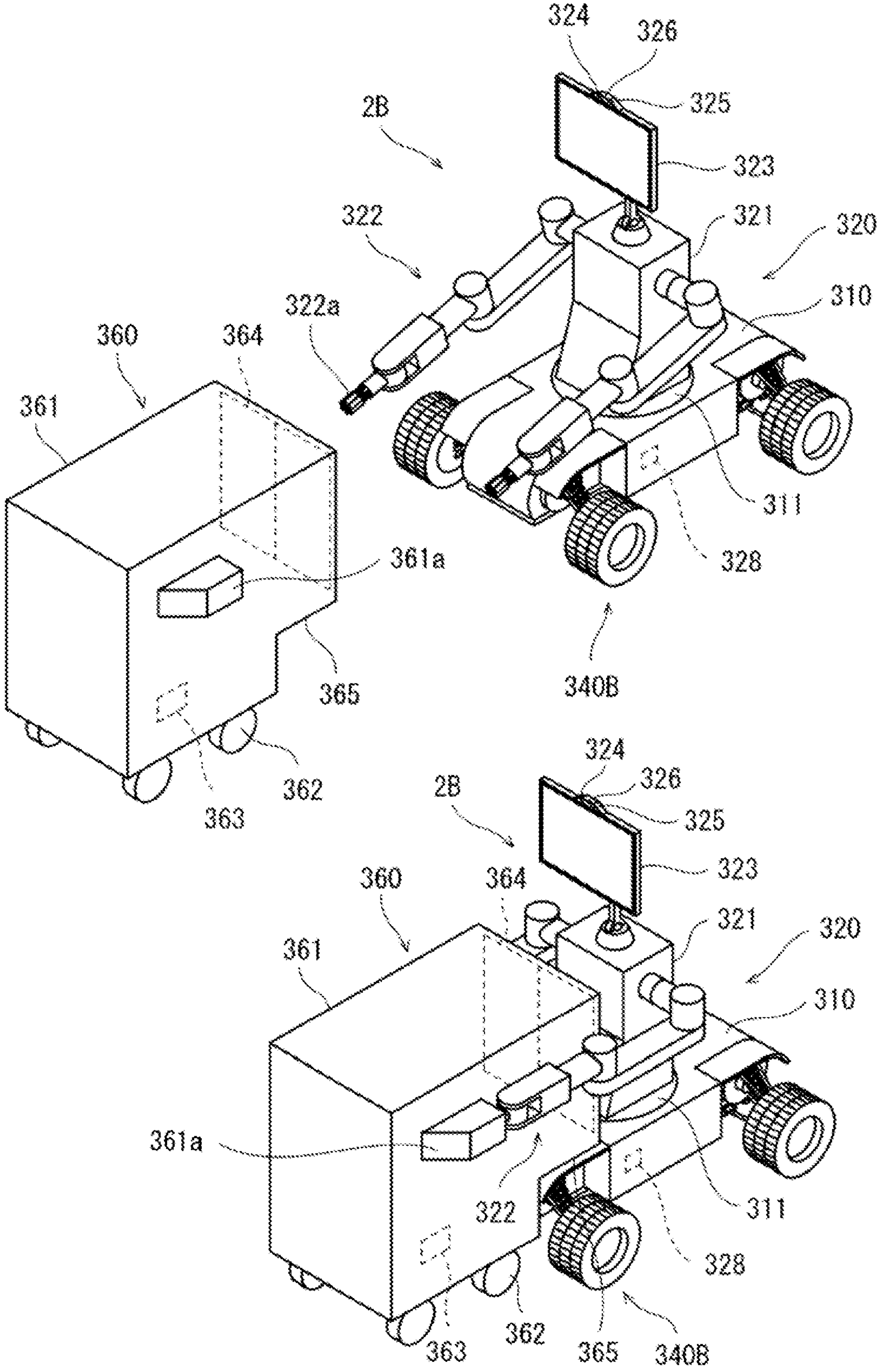
FIG. 12 is a perspective view illustrating a second configuration and use mode of a self-propelled robot in which the mobile robot of FIG. 10 is configured as a delivery robot.
Figure 13:
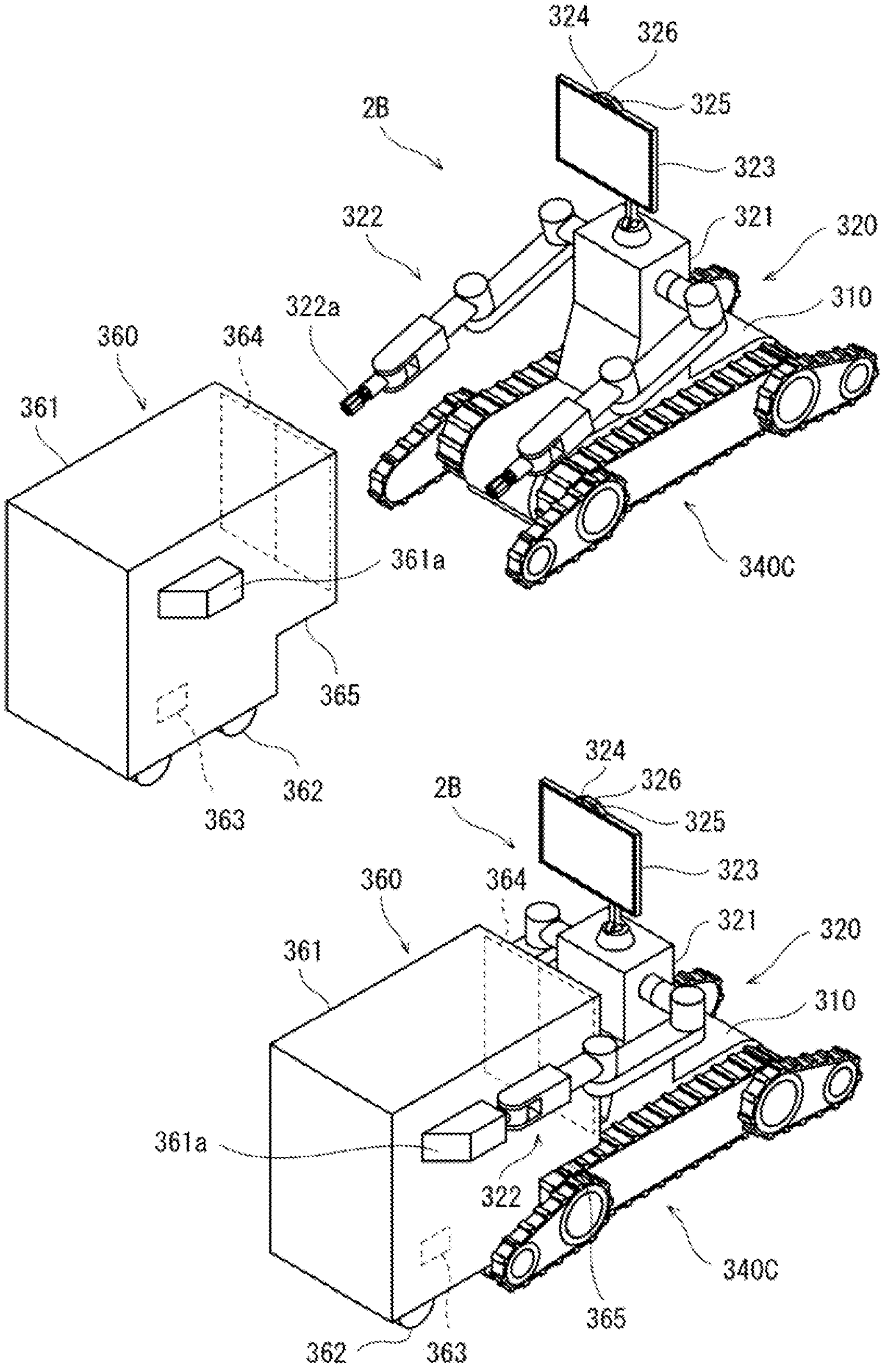
FIG. 13 is a perspective view illustrating a third configuration and use mode of a self-propelled robot in which the mobile robot of FIG. 10 is configured as a delivery robot.
Figure 14:
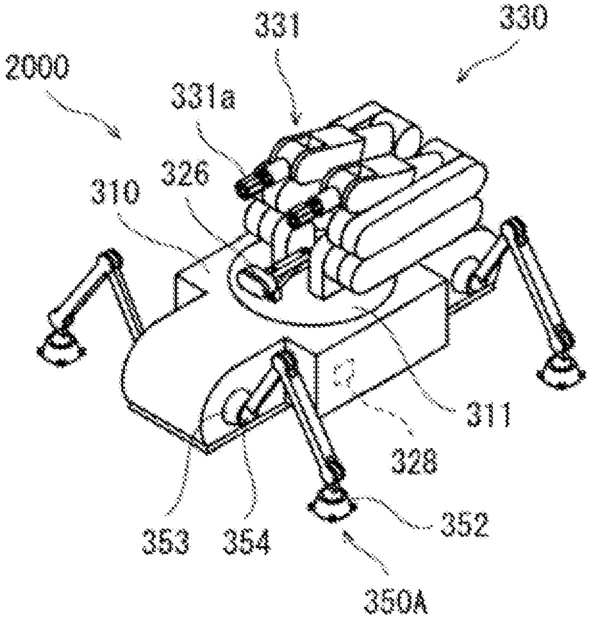
FIG. 14 is a perspective view illustrating a first configuration and use mode of a high-place walking robot in which the mobile robot of FIG. 10 is configured as a maintenance robot.
Figure 14:
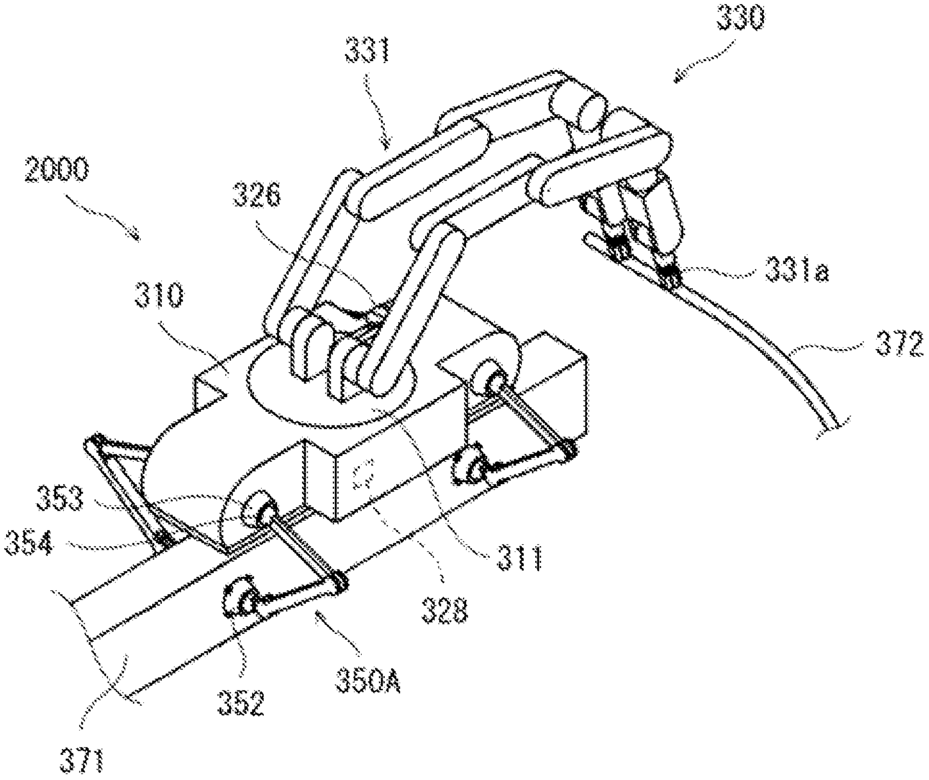
Figure 15:
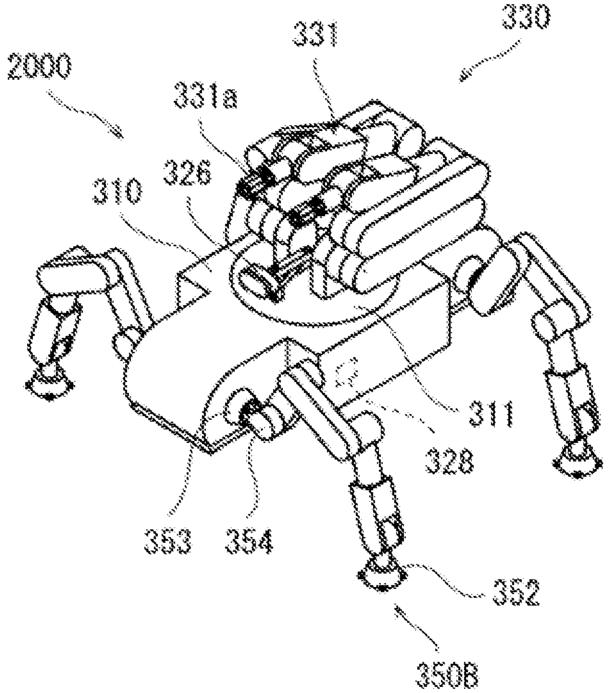
FIG. 15 is a perspective view illustrating a second configuration and use mode of a high-place walking robot in which the mobile robot of FIG. 10 is configured as a maintenance robot.
Figure 15:
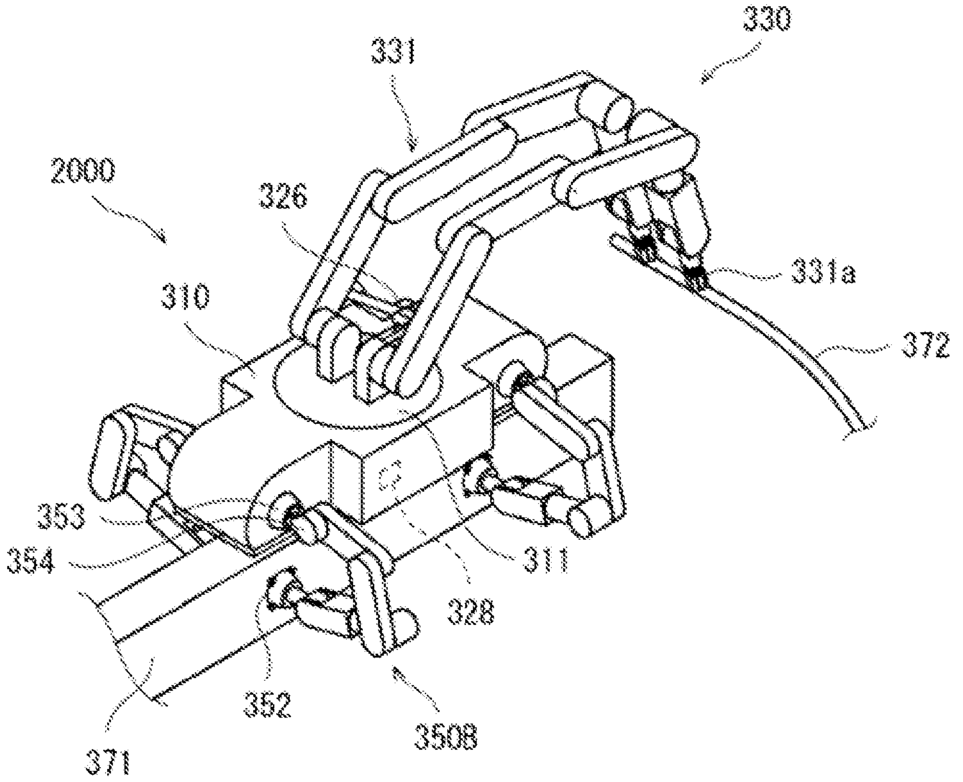

FIG. 10 is an exploded view illustrating one example of a configuration of a mobile robot 1000 used for the unmanned delivery system according to Embodiment 4 of the present disclosure. FIG. 11 is a perspective view illustrating a first configuration and use mode of the self-propelled robot 2B in which the mobile robot 1000 of FIG. 10 is configured as a delivery robot. FIG. 12 is a perspective view illustrating a second configuration and use mode of the self-propelled robot 2B in which the mobile robot 1000 of FIG. 10 is configured as a delivery robot. FIG. 13 is a perspective view illustrating a third configuration and use mode of the self-propelled robot 2B in which the mobile robot 1000 of FIG. 10 is configured as a delivery robot. FIG. 14 is a perspective view illustrating a first configuration and use mode of a high-place walking robot 2000 in which the mobile robot 1000 of FIG. 10 is configured as a maintenance robot. FIG. 15 is a perspective view illustrating a second configuration and use mode of the high-place walking robot 2000 in which the mobile robot 1000 of FIG. 10 is configured as a maintenance robot.

Referring to FIG. 10, the mobile robot 1000 may be selectively configured as the self-propelled robot 2B which is a delivery robot specialized in delivery, or the high-place walking robot 2000 which is a maintenance robot specialized in maintenance of a high-rise structure. Below, this is described in detail.

The mobile robot 1000 includes a base unit 310, a robotic arm unit 320 or 330, and a movable unit 340 or 350. In FIG. 10, the base unit 310 is illustrated in a center part, the robotic arm unit 320 and a wagon 360 are illustrated in an upper left part, the movable unit 340 is illustrated in a lower left part, the robotic arm unit 330 is illustrated in an upper right part, and the movable unit 350 is illustrated in a lower right part.

Referring to FIGS. 11 to 13, by attaching the robotic arm unit 320 to an upper surface of the base unit 310, and attaching the movable unit 340 to side surfaces of both end parts of the base unit 310, the self-propelled robot 2B which is the delivery robot is configured. Referring to FIGS. 14 to 15, by attaching the robotic arm unit 330 to the upper surface of the base unit 310, and attaching the movable unit 350 to the side surfaces of the both end parts of the base unit 310, the high-place walking robot 2000 which is the maintenance robot is configured.

<Base Unit 310>

The base unit 310 is a part which constitutes the body and chassis of the mobile robot 1000, and is formed in a shape having a substantially constant thickness and having thin-width parts at both ends in the longitudinal direction. The base unit 310 includes, at the upper surface of the center part of the base unit 310, a robotic arm unit mounting part 311 to which the robotic arm unit 320 or 330 is attached. For example, the robotic arm unit mounting part 311 is formed in a short pillar shape, and is disposed on the main body of the base unit 310 so as to be rotatable by a motor (not illustrated) on a rotation axis A300 perpendicular to the upper surface of the center part of the base unit 310. The robotic arm unit mounting part 311 is disposed so that its upper surface becomes flush with the upper surface of the center part of the base unit 310.

Further, a movable unit mounting part 312 is disposed on each side surface of the thin-width part at each end part of the base unit 310, and an opening is formed in the movable unit mounting part 312. End parts 313 of axles to which the movable unit 340 or 350 is coupled are exposed from the openings.

One pair of the two pairs of axles corresponding to the thin-width parts of the both end parts of the base unit 310 are configured to be steerable, and the one pair of the two pairs of axles are driving axles which are driven by a driving source (not illustrated), and the other pair of axles are driven axles. Both of the pairs of axles may be driving axles. This driving source includes a motor, for example.

A battery 328 and a robot controller 1201 are mounted on the base unit 310. The battery 328 supplies electric power for operating the mobile robot 1000. The robot controller 1201 is configured similarly to the robot controller 201 of Embodiment 1.

If crawlers are attached to the base unit 310 as the movable units 340C, the base unit 310 is formed to have a thin width throughout its length, and the robotic arm unit mounting part 311 is formed integrally (i.e., inrotatable) with the main body. Further, one pair of axles are non-steering axles. Also in this case, the robotic arm unit mounting part 311 may be rotatable, and the robotic arm unit 320 may be configured to have a structure in which the robotic arm unit 320 is attachable to the robotic arm unit mounting part 311.

Further, as for the base unit 310, if the movable unit 350 is attached to the movable unit mounting part 312, each axle is driven by the motor while being position-controlled individually as a base-end link of the robotic arm.

<Robotic-Arm Unit 320>

The robotic arm unit 320 as the first robotic arm unit is a robotic arm unit which constitutes the self-propelled robot 2B. In order to handle the package to be delivered, since it is necessary to lift the package up to a certain height, the robotic arm unit 320 includes a torso part 321 extending upwardly perpendicular to the upper surface of the robotic arm unit mounting part 311. A pair of robotic arms 322 are disposed at an upper end part of the torso part 321. Each robotic arm 322 includes an articulated robotic arm. Here, the articulated robotic arm is an articulated robotic arm with multiple joints. The configuration of the robotic arm is not limited in particular, and it may be a horizontal articulated arm which is a so-called "SCARA" arm, apart from the vertical articulated arm. A hand 322*a* is attached to a tip end of the robotic arm 322. The configuration of the hand 322*a* is not limited in particular. Here, the hand 322*a* is constructed by a suction hand which sucks an object by using vacuum. The hand 322*a* may be constructed by a hand which pinches the object from both sides, for example.

A customer's display 323 is disposed at an upper end of the torso part 321. The customer's display 323 includes a customer's microphone 324, a customer's speaker 325, and a field-of-view camera 326. The customer's display 323, the customer's microphone 324, the customer's speaker 325, and the field-of-view camera 326 are configured similarly to the customer's display 23, the customer's microphone 24, the customer's speaker 25, and the field-of-view camera 26 of Embodiment 1, respectively. Accordingly, a conversation between the self-propelled robot 2B and the addressee (i.e., the customer) P2 of the address for delivery becomes possible.

As illustrated in FIGS. 11 to 13, upon delivery, the self-propelled robot 2B is coupled to the wagon 360 which accommodates the package to be delivered. The wagon 360 travels by being pushed or pulled by the self-propelled robot 2B, without traveling by itself. Below, a front-and-rear direction in the traveling direction of the wagon 360 is referred to as a front-and-rear direction of the wagon 360. The wagon 360 includes a main body 361 that is made as a rectangular parallelepiped box body. The interior space of the main body 361 is an accommodation space for the package to be delivered.

The main body 361 includes a stepped part 365 which is dented forward in a lower part of the rear end surface. An opening-and-closing door 364 is disposed on the rear surface of the main body 361, above the stepped part 365. This opening-and-closing door 364 is for taking the package to be delivered in and out of the package accommodation space of the main body 361.

Wheels 362 are disposed at four corners of a bottom part of the main body 361, respectively.

A pair of coupling parts 361*a* which include protrusions are disposed on both side surfaces of the main body 361. Coupling holes, which are bottomed holes and accept a pair of hands 322*a* of the self-propelled robot 2B, respectively, are formed in rear end surfaces of the pair of coupling parts 361*a*. The self-propelled robot 2B is coupled to the wagon 360 by inserting the pair of hands 322*a* into the pair of coupling holes and sucking the bottoms of the coupling holes. The coupling structure of the coupling parts 361*a* to the hand 322*a* is not limited to this structure. The coupling structure may be any structure, as long as it is capable of coupling the coupling parts 361*a* to the hands 322*a*, and, for example, mutual engagement parts may be provided to the coupling parts 361*a* and the hands 322*a* to couple one to the other.

The wagon 360 further includes a battery 363. The coupling part 361*a* includes a first electric contact which is electrically connected to the battery 363, and the hand 322*a* of the self-propelled robot 2B includes a second electric contact which is electrically connected to the battery 328. When the self-propelled robot 2B is coupled to the wagon 360, the first electric contact contacts the second electric contact so that they are electrically connected, and the battery 328 of the self-propelled robot 2B is charged by the battery 363 of the wagon 360. This charge is appropriately performed by the control of the base unit 310 by the robot controller 1201, as needed. Therefore, the travelable distance of the self-propelled robot 2B becomes longer than in the case where the wagon 360 does not include the battery 363.

<Movable Unit 340>

The movable unit 340 includes three kinds of travelers for propelling the mobile robot 1000.

A first movable unit 340A includes indoor tires as a first traveller. For example, the indoor tire is formed to have a comparatively small irregularity of the tread. The indoor tire is attached to the base unit 310 so that its rotation shaft is coupled to the end part 313 of the axle of the movable unit mounting part 312 of the base unit 310.

A second movable unit 340B includes outdoor tires as a second traveller. The outdoor tire is formed so as to have a comparatively large irregularity of the tread. A suspension is attached to the tire. The outdoor tire is attached to the base unit 310 so that its rotation shaft is coupled to the end part 313 of the axle of the movable unit mounting part 312 of the base unit 310. Further, the suspension is suitably coupled to the base unit 310.

A third movable unit 340C includes crawlers as a third traveller. The crawler is also referred to as "caterpillar." The crawler is attached to the base unit 310 so that its drive mechanism is coupled to the end part 313 of the axle of the movable unit mounting part 312 of the base unit 310.

<Robotic-Arm Unit 330>

Referring to FIGS. 14 and 15, the robotic arm unit 330 as a second robotic arm unit is a robotic arm unit which constitutes the high-place walking robot 2000. The robotic arm unit 330 includes a pair of robotic arms 331. Each robotic arm 331 includes an articulated robotic arm. Here, the articulated robotic arm is a six-axis robotic arm. A hand 331*a* is attached to a tip end of the robotic arm 331. The configuration of the hand 331*a* is not limited in particular. Here, the hand 331*a* is constructed by a suction hand which sucks an object by using vacuum. The hand 331*a* may be constructed by a hand which pinches the object, for example.

Referring to FIGS. 14 and 15, since the robotic arm unit 330 requires a long arm extending horizontally in order to perform maintenance at a high place, the two robotic arms 331 are directly attached to the robotic arm unit mounting part 311 of the base unit 310. Therefore, the two robotic arms 331 can extend near and along the upper surface of the base unit 310. Further, since it is necessary to carry the high-place walking robot 2000 up to the high place, the robotic arm unit 330 is configured so that the robotic arms 331 are foldable compactly.

The robotic arm unit 330 further includes the field-of-view camera 326. The field-of-view camera 326 is also directly attached to the robotic arm unit mounting part 311 of the base unit 310. The field-of-view camera 326 is configured similarly to the field-of-view camera 26 of Embodiment 1. In addition, the robotic arm unit 330 may include a microphone and a speaker for cooperation with a field worker and for gathering surrounding information.

<Movable Unit 350>

The movable unit 350 is comprised of two kinds of legs which allow the mobile robot 1000 to walk at the heights.

A fourth movable unit 350A is comprised of a short leg as a first leg. The short leg is comprised of a five-axis robotic arm, for example. In the five-axis robotic arm, a base-end link 354 corresponds to a root part of the leg, and a tip-end part 352 corresponds to a foot part of the leg. The base-end link 354 is coupled to the end part 313 of the axle of the movable unit mounting part 312 of the base unit 310. The tip-end part 352 is configured to be twistable to the coupled link. The tip-end part 352 is configured to attract an object. Here, the tip-end part 352 includes an electromagnet, and by turning on the electromagnet, the tip-end part 352 attracts a magnetic object, and by turning off the electromagnet, the tip-end part 352 releases the magnetic object. Therefore, while the tip-end part 352 attracts and fixes the object in a state where the twist axis of the tip-end part 352 is parallel to the rotation axis of the base-end link 354, and the twist of the tip-end part 352 is compliance-controlled, when the base-end link 354 is rotated, the base unit 310 moves in a direction opposite from the rotation direction. Therefore, as described later, the high-place walking robot 2000 is capable of walking like a caterpillar (measuring worm).

The fourth movable unit 350A further includes a hollow fixed cover member 353. The fixed cover member 353 is fixed to the movable unit mounting part 312 of the base unit 310 so that the base-end link 354 rotatably penetrates therethrough. Therefore, the short leg is attached to the base unit 310.

A fifth movable unit 350B is comprised of a long leg as a second leg. The long leg is comprised of a seven-axis robotic arm, for example. Other configurations are similar to those of the fourth movable unit 350A.

<First Configuration and Use Mode of Self-Propelled Robot 2B>

Referring to FIG. 11, according to the first configuration of the self-propelled robot 2B, the robotic arm unit 320 is attached to the robotic arm unit mounting part 311 of the base unit 310, and the indoor tire of the first movable unit 340A is attached to each movable unit mounting part 312 of the base unit 310. Therefore, the delivery robot for indoor traveling is configured as the first configuration of the self-propelled robot 2B.

This self-propelled robot 2B is used for transporting the package, for example, at the logistics base 5. The logistics base 5 may be a collection-and-delivery center. In this case, the self-propelled robot 2B performs, for example, the following collection-and-delivery work.

First, the self-propelled robot 2B couples itself to the wagon 360 by inserting the pair of hands 322*a* of the pair of robotic arms 322 into the coupling holes of the pair of coupling parts 361*a* of the wagon 360, and sucking the bottoms of the coupling holes by the hands 322*a*. At this time, the battery 328 of the self-propelled robot 2B is charged by the battery 363 of the wagon 360. Further, the front end part of the self-propelled robot 2B is located at the stepped part 365 of the rear surface of the wagon 360, and the self-propelled robot 2B approaches the wagon 360 and is coupled to the wagon 360.

Next, the self-propelled robot 2B travels by itself to a bulk storage, while pushing or pulling the wagon 360. Next, the self-propelled robot 2B stops the suction of the pair of hands 322*a*, and pulls the pair of hands 322*a* out of the coupling holes of the pair of coupling parts 361*a* of the wagon 360 so that it separates from the wagon 360. Next, the self-propelled robot 2B itself loads the package into the wagon 360. That is, the robot which transports the package is the same as the robot which loads and unloads the package. In detail, the self-propelled robot 2B uses the pair of robotic arms 322 to open the opening-and-closing door 364 of the wagon 360, hold the package placed at the bulk storage by the pair of hands 322*a* of the pair of robotic arms 322, and place it in the accommodation space of the wagon 360. Here, the self-propelled robot 2B performs this work while swiveling the torso part 321, if needed. When the necessary package is accommodated in the wagon 360, the self-propelled robot 2B closes the opening-and-closing door 364, couples itself to the wagon 360, and travels by itself to a given location.

Then, if needed, the self-propelled robot 2B performs the work in the reversed order to separate itself from the wagon 360 and take out the package from the wagon 360.

During the above-described work, the self-propelled robot 2B may have a conversation with a person by using the customer's display 323, the customer's microphone 324, the customer's speaker 325, and the field-of-view camera 326, if needed.

<Second Configuration and Use Mode of Self-Propelled Robot 2B>

Referring to FIG. 12, according to the second configuration of the self-propelled robot 2B, the robotic arm unit 320 is attached to the robotic arm unit mounting part 311 of the base unit 310, and the outdoor tire of the second movable unit 340B is attached to each movable unit mounting part 312 of the base unit 310. Therefore, the delivery robot for outdoor traveling is configured as the second configuration of the self-propelled robot 2B.

Since the self-propelled robot 2B of this second configuration includes the outdoor tires, it is suitably used as a self-propelled robot for delivery which eventually delivers the package to the receiver's address 4. Other configurations are similar to those of the self-propelled robot 2B of the first configuration.

<Third Configuration and Use Mode of Self-Propelled Robot 2B>

Referring to FIG. 13, according to the third configuration of the self-propelled robot 2B, the robotic arm unit 320 is attached to the robotic arm unit mounting part 311 of the base unit 310, and the crawler of the third movable unit 340C is attached to each movable unit mounting part 312 of the base unit 310. Therefore, the delivery robot for rough terrain traveling is configured as the third configuration of the self-propelled robot 2B.

Since the self-propelled robot 2B of the third configuration includes the crawlers, it is suitably used as a self-propelled robot for rough terrain delivery in which it travels a rough terrain and eventually delivers the package to the receiver's address 4. Other configurations are similar to those of the self-propelled robot 2B of the first configuration. The rough terrain may be a road during a disaster, and irregular ground, for example. The self-propelled robot 2B of the second configuration changes its direction by slowing down or stopping one of the crawlers.

<First Configuration and Use Mode of High-Place Walking Robot 2000>

Referring to FIG. 14, according to the first configuration of the high-place walking robot 2000, the robotic arm unit 330 is attached to the robotic arm unit mounting part 311 of the base unit 310. In detail, for example, the pair of robotic arms 331 are attached to the robotic arm unit mounting part 311 of the base unit 310 so that they are located symmetrically with respect to the rotation axis A300. Then, the field-of-view camera 326 is attached to the robotic arm unit mounting part 311 so that it is located ahead of the center of the pair of robotic arms 331. Moreover, if a microphone and a speaker for cooperation with a field worker and for gathering surrounding information are disposed, they are suitably attached to the robotic arm unit mounting part 311 or the field-of-view camera 326. Further, the short leg of the fourth movable unit 350A is attached to each movable unit mounting part 312 of the base unit 310. Therefore, the maintenance robot which performs maintenance while walking at the heights is configured as the first configuration of the high-place walking robot 2000.

The high-place walking robot 2000 of the first configuration is used as follows, for example.

For example, the high-place walking robot 2000 is transported to a maintenance site in the high-rise building by the drone of Embodiment 1. The high-rise building may be a steel tower. Then, for example, if a scaffold member 371 which is a magnetic member used as scaffold exists in the high-rise structure, the high-place walking robot 2000 sticks the tip-end part 352 of each short leg to a side surface of the scaffold member 371. The scaffold member 371 may be a horizontal beam member of the steel tower. Then, while checking a target object 372 by the field-of-view camera 326, it performs necessary maintenance, while sticking to and holding the target object by the pair of hands 331*a* of the pair of robotic arms 331. The target object 372 may be a wire rod.

In this case, the high-place walking robot 2000 walks as follows.

For example, while having a small gap from the scaffold member 371, the high-place walking robot 2000 sticks the tip-end part 352 of each short leg to the scaffold member 371 in a state where the twist axis of the tip-end part 352 is parallel to the rotation axis of the base-end link 354, and rotates the base-end link 354 rearward, while compliance-controlling the twist of the tip-end part 352. Thus, the base unit 310 moves forward and downward by the principle of the "parallel link." When the base unit 310 contacts the scaffold member 371, the high-place walking robot 2000 moves the tip-end parts 352 of the two pairs of short legs forward, and sticks and fixes the tip-end parts 352 similarly to the above. Then, as the base-end link 354 is rotated rearward similarly to the above, the base unit 310 moves upwardly while moving forward, and then moves downwardly and contacts the scaffold member 371. Thereafter, by repeating this operation, the high-place walking robot 2000 walks like a caterpillar.

If the scaffold member 371 is not horizontal, the high-place walking robot 2000 can walk like a caterpillar by moving the four short legs forward one by one, while maintaining a state of so-called "three-point support."

<Second Configuration and Use Mode of High-Place Walking Robot 2000>

Referring to FIG. 15, according to the second configuration of the high-place walking robot 2000, the robotic arm unit 330 is attached to the robotic arm unit mounting part 311 of the base unit 310 similarly to the above. Further, the long leg of the fifth movable unit 350B is attached to each movable unit mounting part 312 of the base unit 310. Therefore, a maintenance robot which performs maintenance while walking at the heights is configured as the second configuration of the high-place walking robot 2000.

Since the high-place walking robot 2000 of the second configuration has the long legs which are longer and thicker as compared with the short legs, it can perform more extensive maintenance.

Operation and Effects by Embodiment of Present Disclosure

The robot controller 201 may be configured to control the self-propelled robot 2, selectively by one of the autonomous operation and the remote operation.

According to this configuration, the unmanned delivery can be performed more easily by performing the comparatively easy work by the autonomous operation and performing the comparatively difficult work by the remote operation.

The unmanned delivery system 100 may include the self-propelled robots 2, and the robot interface 31 which remotely operates the self-propelled robots 2. The self-propelled robots 2 and the robot interface 31 may be configured so that the self-propelled robots 2 are operable by the sole robot interface 31.

According to this configuration, the unmanned delivery can be performed efficiently.

The unmanned aerial vehicle 1 may include the hoist 11 which can lower the loaded object onto the ground, and can load the object on the ground. The robot controller 201 may be configured so that the self-propelled robot 2 fixes itself to the hoist 11 and confirms that it is fixed.

According to this configuration, the self-propelled robot 2 can be carried in the unmanned aerial vehicle 1 safely.

When the self-propelled robot 2 is loaded in the unmanned aerial vehicle 1, the robot controller 201 may control the self-propelled robot 2 so that the self-propelled robot 2 takes the given storing posture, and charges its secondary battery 328 from the unmanned aerial vehicle 1.

According to this configuration, by the self-propelled robot 2 taking the given storing posture, the accommodation space for the package G can be increased, and by charging its secondary battery 328 from the unmanned aerial vehicle 1, the self-propelled robot 2 can be operated securely.

The self-propelled robot 2B may include the three assembly units that are the robotic arm unit 320, the base unit 310, and the movable unit 340 which moves the self-propelled robot 2B. The robotic arm unit 320 may be attached to the upper surface of the base unit 310, and the movable unit 340 may be attached to the side surface of the base unit 310.

According to this configuration, it is possible to easily assemble the self-propelled robot 2B.

The first robotic arm unit 320 which includes the torso part 321 extending perpendicular to the upper surface of the base unit 310, and the second robotic arm unit 330 which is attached directly to the upper surface of the base unit 310 and is extendable near and along the upper surface of the base unit 310 may be selectively attachable to the upper surface of the base unit 310. The traveller 340 which propels the self-propelled robot 2B, and the leg 350 which causes the self-propelled robot 2B to walk at the heights may be selectively attachable to the side surface of the base unit 310.

According to this configuration, by attaching the first robotic arm unit 320 to the upper surface of the base unit 310, and attaching the traveller 340 to the side surface of the base unit 310, the self-propelled robot 2B for delivery can be constituted, for example. Alternatively, by attaching the second robotic arm unit 330 to the upper surface of the base unit 310, and attaching the leg 350 to the side surface of the base unit 310, the high-place walking robot 2000 for maintenance of the high-rise structure can be constituted, for example.

It is apparent for the person skilled in the art that many improvements and other embodiments are possible from the above description. Therefore, the above description is to be interpreted only as illustration.

The invention claimed is:

1. An unmanned delivery system comprising:
a self-propelled robot;
an unmanned aerial vehicle that transports a package to an intermediate location on the way of delivering the package; and
robot circuitry that controls the self-propelled robot so that the self-propelled robot delivers to a receiver's address the package that is unloaded from a storage of the unmanned aerial vehicle at the intermediate location, wherein
when the self-propelled robot is loaded in the storage of the unmanned aerial vehicle, the robot circuitry controls the self-propelled robot so that the self-propelled robot (i) takes a given storing posture, (ii) charges a secondary battery of the self-propelled robot using power from the unmanned aerial vehicle, and (iii) fixes the self-propelled robot to the storage after charging the secondary battery.

2. The unmanned delivery system of claim 1, wherein the robot circuitry controls the self-propelled robot, selectively by one of an autonomous operation and a remote operation.

3. The unmanned delivery system of claim 1, wherein the self-propelled robot includes a plurality of self-propelled robots, the unmanned delivery system comprising a robot interface that remotely operates the self-propelled robots, and
wherein the self-propelled robots and the robot interface are configured so that the self-propelled robots are operable by a sole robot interface.

4. The unmanned delivery system of claim 1, wherein the unmanned aerial vehicle includes a hoist that lowers a loaded object onto the ground and loads an object on the ground, and
wherein the robot circuitry fixes the self-propelled robot to the hoist, and confirms that the self-propelled robot is fixed to the hoist.

5. The unmanned delivery system of claim 1, wherein the self-propelled robot includes three assembly units which are a robotic arm unit, a base unit, and a movable unit that moves the self-propelled robot, and
wherein the robotic arm unit is attached to an upper surface of the base unit, and the movable unit is attached to a side surface of the base unit.

6. The unmanned delivery system of claim 5, wherein a first robotic arm unit that includes a torso part extending perpendicular to the upper surface of the base unit, and a second robotic arm unit that is attached directly to the upper surface of the base unit and is extendable near and along the upper surface of the base unit are selectively attachable to the upper surface of the base unit, and
wherein a traveller that propels the self-propelled robot, and a leg that causes the self-propelled robot to walk at heights are selectively attachable to the side surface of the base unit.

7. An unmanned delivery system comprising:
a self-propelled robot;
an unmanned aerial vehicle that transports a package and the self-propelled robot to an intermediate location on the way of delivering the package; and
robot circuitry that controls the self-propelled robot so that the self-propelled robot delivers to a receiver's address the package that is unloaded from a storage of the unmanned aerial vehicle at the intermediate location, wherein
when the self-propelled robot is loaded in the storage of the unmanned aerial vehicle, the robot circuitry controls the self-propelled robot so that the self-propelled robot (i) takes a given storing posture, (ii) charges a secondary battery of the self-propelled robot using power from the unmanned aerial vehicle, and (iii) fixes the self-propelled robot to the storage after charging the secondary battery.

8. An unmanned delivery method comprising the steps of:

transporting, by an unmanned aerial vehicle, a package to an intermediate location on the way of delivering the package; and delivering to a receiver's address, by the self-propelled robot, the package that is unloaded from a storage of the unmanned aerial vehicle at the intermediate location, wherein when the self-propelled robot is loaded in the storage of the unmanned aerial vehicle, the self-propelled robot is controlled so that the self-propelled robot (i) takes a given storing posture, (ii) charges a secondary battery of the self-propelled robot using power from the unmanned aerial vehicle, and (iii) fixes the self-propelled robot to the storage after charging the secondary battery.

9. An unmanned delivery method comprising the steps of:

transporting, by an unmanned aerial vehicle, a package and a self-propelled robot to an intermediate location on the way of delivering the package; and delivering to a receiver's address, by the self-propelled robot, the package that is unloaded from a storage of the unmanned aerial vehicle at the intermediate location, wherein when the self-propelled robot is loaded in the storage of the unmanned aerial vehicle, the self-propelled robot is controlled so that the self-propelled robot (i) takes a given storing posture, (ii) charges a secondary battery of the self-propelled robot using power from the unmanned aerial vehicle, and (iii) fixes the self-propelled robot to the storage after charging the secondary battery.

* * * * *